United States Patent
Shipman et al.

(10) Patent No.: US 10,225,734 B1
(45) Date of Patent: Mar. 5, 2019

(54) SECURED STORAGE FOR ELECTRONIC DEVICES

(71) Applicant: TECH FRIENDS, INC., Jonesboro, AR (US)

(72) Inventors: Bob Shipman, Jonesboro, AR (US); Bryan Taylor, Bono, AR (US); Jason Cochran, Jonesboro, AR (US)

(73) Assignee: Tech Friends, Inc., Jonesboro, AR (US)

( * ) Notice: Subject to any disclaimer, the term of this patent is extended or adjusted under 35 U.S.C. 154(b) by 245 days.

(21) Appl. No.: 15/136,604

(22) Filed: Apr. 22, 2016

Related U.S. Application Data

(63) Continuation-in-part of application No. 14/923,271, filed on Oct. 26, 2015, which is a continuation of application No. 14/869,592, filed on Sep. 29, 2015.

(51) Int. Cl.
| | |
|---|---|
| *H02J 7/00* | (2006.01) |
| *H04W 12/06* | (2009.01) |
| *H04B 1/3888* | (2015.01) |
| *H02J 7/02* | (2016.01) |

(52) U.S. Cl.
CPC ............ *H04W 12/06* (2013.01); *H02J 7/007* (2013.01); *H02J 7/0044* (2013.01); *H02J 7/0045* (2013.01); *H02J 7/025* (2013.01); *H04B 1/3888* (2013.01)

(58) Field of Classification Search
USPC ........................................................ 320/107
See application file for complete search history.

(56) References Cited

U.S. PATENT DOCUMENTS

| | | | | |
|---|---|---|---|---|
| 5,937,346 A | * | 8/1999 | Ono ..................... | H04W 12/12 340/5.32 |
| 2002/0156537 A1 | * | 10/2002 | Sakakibara .......... | H02J 7/0021 700/1 |
| 2007/0244471 A1 | * | 10/2007 | Malackowski ....... | H01M 10/42 606/1 |
| 2009/0278495 A1 | * | 11/2009 | Kaye ..................... | H02J 7/0027 320/114 |
| 2010/0102777 A1 | * | 4/2010 | Sa .......................... | H02J 7/0044 320/115 |
| 2013/0026972 A1 | * | 1/2013 | Luke ..................... | G07F 17/12 320/106 |

(Continued)

FOREIGN PATENT DOCUMENTS

JP       2003230229 A    *    8/2003

OTHER PUBLICATIONS

Machine Translation of JP2003-230229.*

*Primary Examiner* — Samuel Berhanu
(74) *Attorney, Agent, or Firm* — Schrantz Law Firm, PLLC; Stephen D. Schrantz

(57) ABSTRACT

The secured storage receives an electronic device including but not limited to a tablet, smart phone, mobile computing device, or other computing device. The secured storage provides a charging system that charges the device. The lock of the secured storage secures the electronic device within the storage. The system maintains a log of the users who access the electronic devices. The system then control access by granting access to users and restricting access to users based upon usage history, behavior, or other criteria. The lock adjusts between locked to secure the device and unlocked to allow access to the device.

15 Claims, 20 Drawing Sheets

(56) References Cited

U.S. PATENT DOCUMENTS

| | | | |
|---|---|---|---|
| 2015/0074004 A1* | 3/2015 | Song | G07F 17/0057 705/307 |
| 2015/0108948 A1* | 4/2015 | Gulick, Jr. | G08B 13/149 320/115 |

* cited by examiner

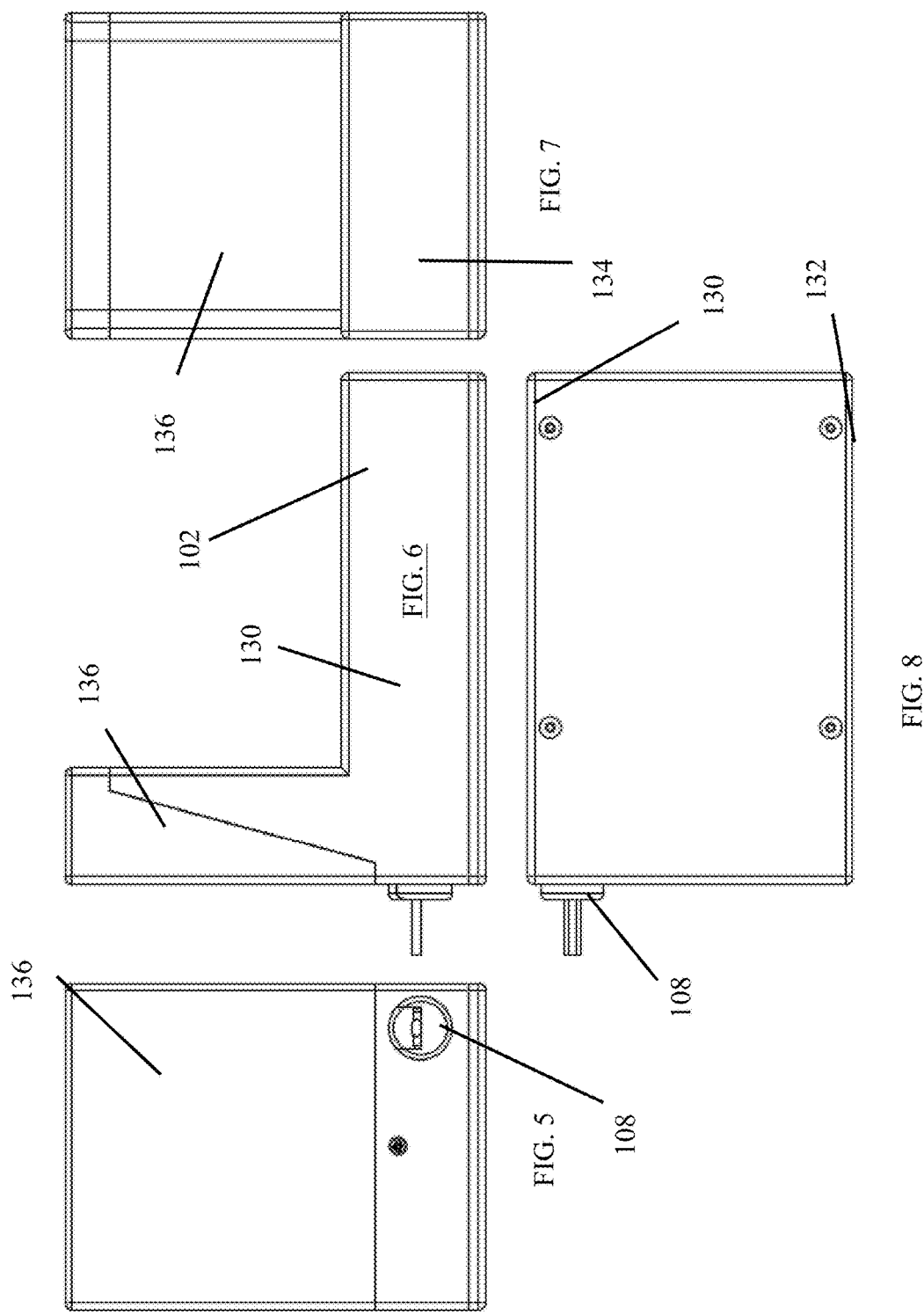

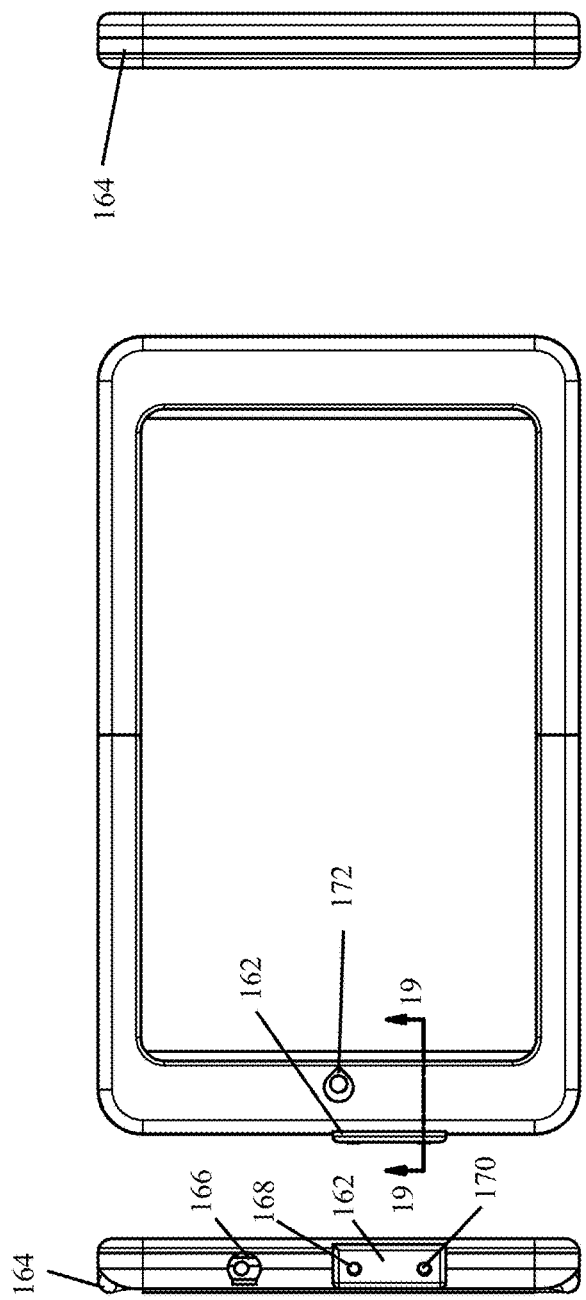

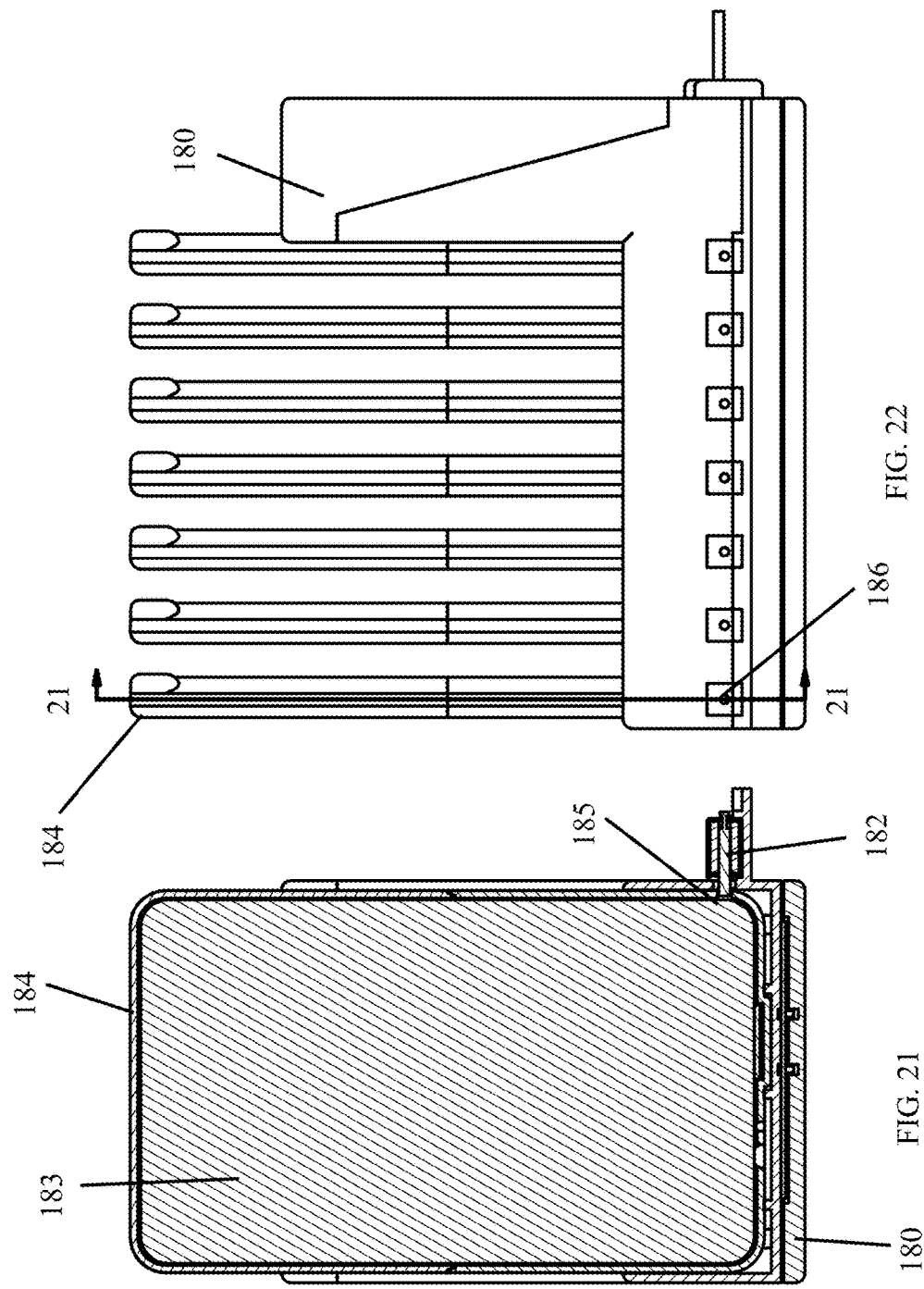

SECURED STORAGE FOR ELECTRONIC DEVICES

CROSS-REFERENCE TO RELATED APPLICATIONS

This application claims priority to and is a continuation in part of U.S. patent application Ser. No. 14/923,271 entitled "Protective Housing" that was filed on Oct. 26, 2015 which is a continuation in part of U.S. patent application Ser. No. 14/869,592 entitled "Charging Unit and System" that was filed on Sep. 29, 2015.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to a security system for securely storing tablets, smart phones, mobile computing devices, mobile electronic devices, and other electronic devices to prevent unauthorized access to the device. The secured storage system may also be implemented with a charger station for charging the electronic device. In another embodiment, the secured storage system may securely store the electronic device to prevent unauthorized access to the device.

The secured storage provides a lock that locks the device into position. The lock controls access to the device. If the user is granted access, the lock of one embodiment retracts within housing to allow removal of the device from the housing. To secure the device, the lock extends from the housing towards the device.

The secure storage also provides a method of charging the device via a charging station. The present invention replaces the traditional cords that are plugged into the device. Instead, the system inserts a charging adapter that provides charging contacts for charging. A charging station is plugged into a power source to supply power to charging contacts within the station. The charging station aligns the charging contacts of the charging adapter with the charging contacts of the charging station. The contact between the charging contacts charges the devices.

The charging station is keyed to accept insertion of the device in a particular orientation. The keying of the charging station prevents users from incorrectly inserting the device into the charging station.

The charging system also provides a protective housing for the device. The housing is keyed to the charging station to orient the device when inserting the device into the charging station. The charging adapter, in one embodiment, is secured within the housing to enable charging of the device.

In one embodiment, protective housing provides a locking aperture for accepting the lock. The lock inserts into the locking aperture to secure the housing and the device within the secured storage.

The housing protects the device from damage. The housing also prevents access to certain features of the device. Eliminating access to these features prevents users from gaining unauthorized access to the device. The housing also prevents users from resetting the device to allow unfettered access to the user.

II. Description of the Known Art

Certain problems exist with the known art. Known housings for tablets and other electronic devices provide unfettered access to the device. Known housings allow access to some buttons and other inputs that can be used to disable certain security features.

Known housings do not securely store the devices within the housing to prevent unauthorized access. Instead, people are allowed to freely remove the devices from the storage without providing any authorization or credentials to access the system. The known art relies on software to control access. The secured storage of the present invention incorporates a physical device for physically securing the device.

With the increase of technology, prisons and jails are providing inmates with access to tablets and other electronic devices. The increased availability of information has provided users with information required to reset the devices and reset the access. Thus, the prisoners can override security features that were previously enabled. Furthermore, the secured storage can authenticate the devices access by a particular user and can control the amount of time for which the user can access the device.

The known systems require either the user to plug in a cord to the device to charge the devices or require a specialized cord. These cords are expensive. Furthermore, these cords could be used as a weapon in the wrong hands. The present invention eliminates the need for a cord to be plugged into each individual device.

Wireless charging is known. However, such wireless charging requires special devices and chargers for the inductive charging. The present invention provides wireless charging without the need for inductive charging. Therefore, the present invention provides wireless charging at a reduced cost.

Therefore, the present invention is needed to provide a unique charging system that increases safety and reduces costs. The present invention is also needed to safely secure an electronic device while at an airport or other location where others may have access to a user's device. The present invention securely stores the device to limit other's use of the actual device.

SUMMARY OF THE INVENTION

The present invention relates to secured storage for storing tablets, smart phones, mobile electronic devices, mobile computing devices, and other electronic devices. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The secured storage system of the present invention limits access to the electronic device by locking the device within storage until authentication or authorization is given for removal of the device.

In one embodiment, the storage system simply secures the device to prevent unauthorized access. The secured storage may also be implemented with a charger for charging the device. The storage system may include the appropriate charging adapter for insertion into the electronic device. In one embodiment, the secured storage simplifies the process of charging the devices by removing the need to insert a plug into the electronic device for charging.

The secured storage system of one embodiment provides a housing for the electronic device and a charging base designed to receive the housing. The charging base is configured to accept the housing in a set orientation. In one embodiment, retention arms protrude laterally from an interior portion of a first wall and a second wall located opposite the first wall. The retentions arms support the housing when inserted into the charging base.

In one embodiment, the retention arms provide a unique shape to allow insertion of the housing into the charging base in a set orientation. The retention arms of such an embodiment prevent insertion of the housing into the storage base when the housing is oriented in a non-charging orientation. Such a configuration promotes charging of device when inserted into the storage device.

Most devices provide a port for accepting a charger. The charging port may accept USB, USB micro, USB mini, Lightning, or other electrical insertion connection. New connections with new ports will more than likely be developed in the future. A charging adapter of the present invention inserts into the port of the device. The charging adapter can be modified to function with the new ports and electrical insertion connections.

The housing of one embodiment secures the charging adapter within the port. The charging adapter provides two charging contacts for charging the device.

The two charging contacts contact the charging contacts of the charging adapter to complete a circuit when the housing is inserted into the charging base in the charging orientation. Electricity flows from the charging base to the device via the charging contacts.

In one embodiment, the retention arms support the housing and device when the device is inserted into the storage base and charging station. The retention arms align the charging contacts of the charging adapter with the charging contacts of the charging base. The device can then charge properly without insertion of a cord into the port. The contact between the charging contacts supply sufficient power to charge the device when the charging base is plugged into a power source.

The power source supplies power to the charging contacts within the base. The charging station is keyed to accept insertion of the device in a particular orientation. The keying of the charging station prevents users from incorrectly inserting the device into the charging station. The retention arms create a retention aperture that accepts the housing in a set orientation.

The retention arms and retention aperture accept the housing in a charging orientation. The housing positioned in the charging orientation aligns the charging contacts. The retention arms prevent insertion of the housing into the charging station in an orientation in which the charging contacts cannot contact each other to transfer electricity to the device.

The charging system also provides a protective housing for the device. The housing is keyed to the charging station to orient the device when inserting the device into the charging station. The charging adapter is secured within the housing to enable charging of the device. Keyed locks or audible alarms could increase the security features of the present invention.

The housing of one embodiment protects the device from damage. The housing may also prevent access to certain features of the device. Eliminating access to these features prevents users from gaining unauthorized access to the device. The housing also prevents users from resetting the device to allow unfettered access to the user.

It is an object of the present invention to securely store a mobile electronic device within secure storage.

It is an object of the present invention to provide a housing that accepts a lock to secure the electronic device.

It is an object of the present invention to secure an electronic device not stored in a specialized case within the secure storage.

It is an object of the present invention to limit access to the electronic device by storing the device within the secure storage.

It is an object of the present invention to monitor usage of the electronic device by maintaining records of users who remove the device from the secure storage.

It is an object of the present invention to control access to the electronic device by restricting user's access to the device from the storage.

It is an object of the present invention to control access to the electronic device by allowing user's access to the device from the storage.

It is an object of the present invention to charge a mobile electronic device without a cord.

It is another object of the present invention to simplify the process of charging a mobile electronic device.

It is another object of the present invention to reduce the costs associated with charging multiple devices.

It is another object of the present invention to reduce problems associated with charging a mobile electronic device stored within a housing.

It is another object of the present invention to correctly orient the device when inserting the device into the charging station.

It is another object of the present invention to charge multiple mobile electronic devices within a single charging station.

It is another object of the present invention to protect the mobile electronic device within a housing.

It is another object of the present invention to reduce access to the mobile electronic device.

It is another object of the present invention to obstruct buttons on the device to prevent users from accessing certain features of the mobile electronic device.

It is another object of the present invention to key the housing to allow insertion of the housing into the charging station in a charging orientation.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a rear view thereof;

FIG. 6 is a left side view thereof, the right side view being a mirror image of the left side view;

FIG. 7 is a front view thereof;

FIG. 8 is a bottom view thereof;

FIG. 13 is a left side view thereof;

FIG. 14 is a bottom view thereof;

FIG. 15 is a front view thereof;

FIG. 16 is a top view thereof;

FIG. 17 is a right side view thereof;

FIG. 21 is a partial view of one embodiment of the present invention;

FIG. 22 is a right side view thereof;

DETAILED DESCRIPTION

Figure 1:
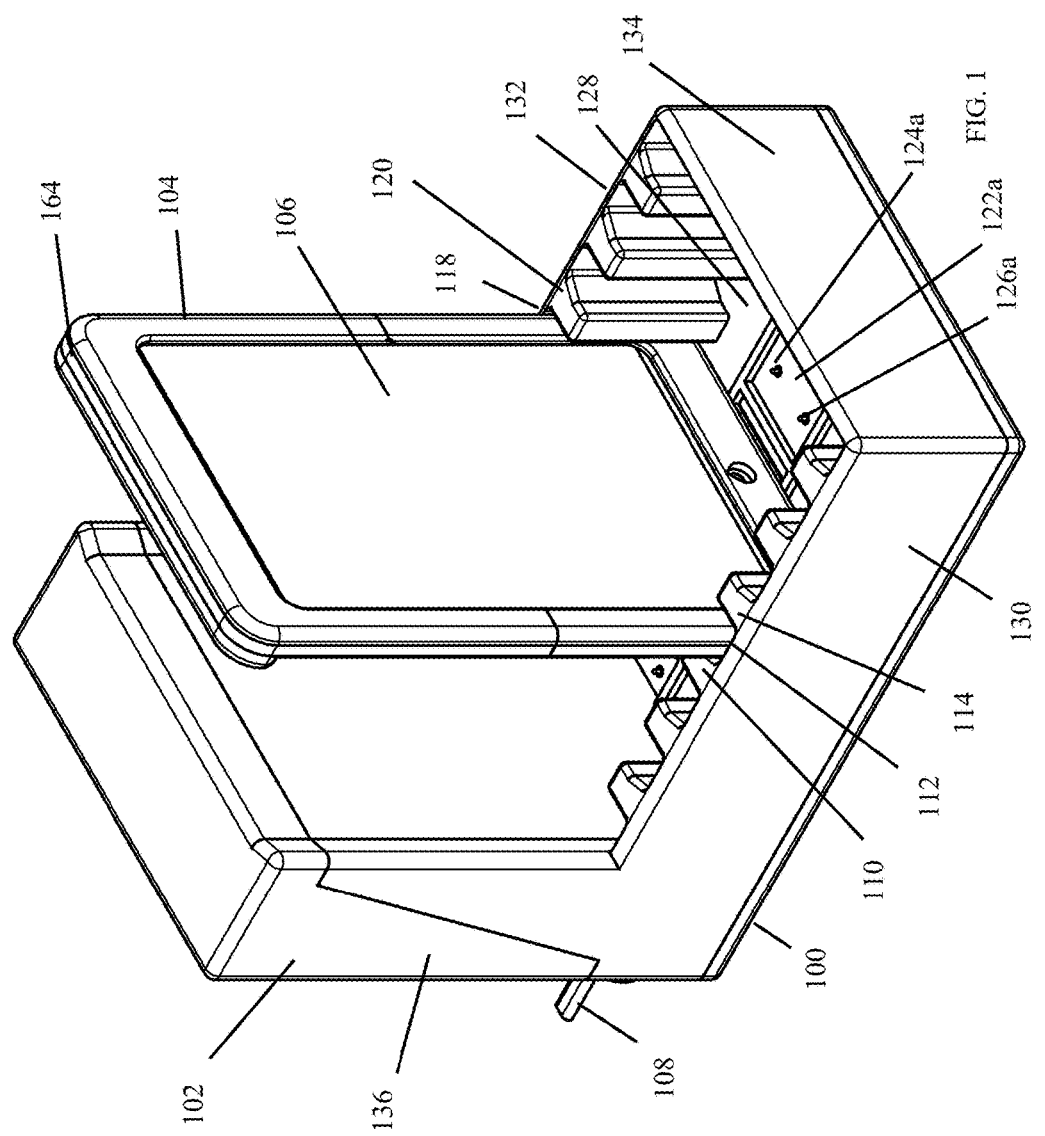
FIG. 1 is an environmental view of one embodiment of the present invention.
Figure 2:
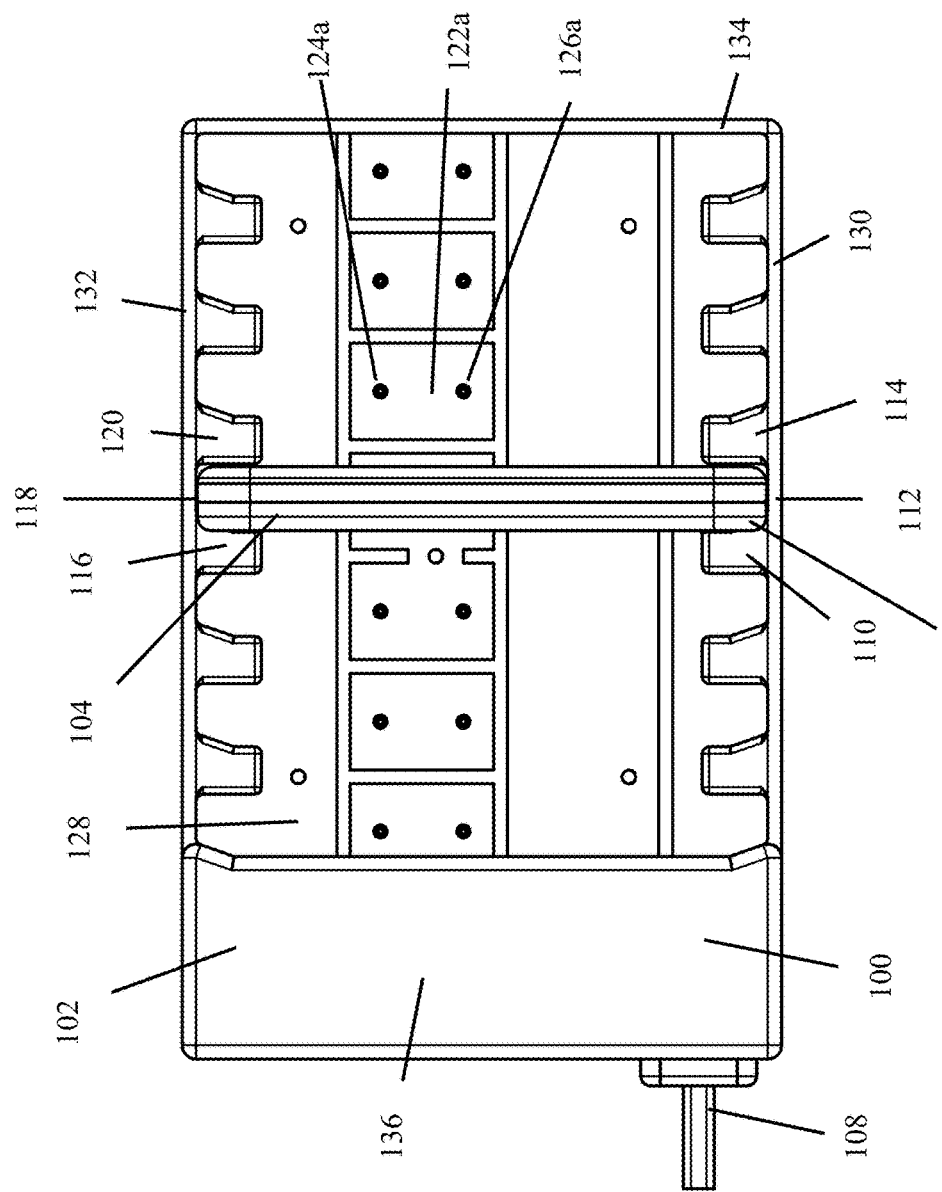
FIG. 2 is an environmental view thereof.

FIGS. 1 and 2 show an environmental view of one embodiment of the charging system 100 for storage of a mobile computing device. The charging system 100 provides a charging base 102 and a housing 104 that at least partially encloses a mobile computing device 106. The present invention has been described as operating for a mobile computing device. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The charging system 100 simplifies the process of charging the devices by removing the need to insert a plug into the port of the device to charge.

Most devices 106 provide a port for accepting a charger. The port may accept USB, USB micro, USB mini, Lightning, or any other electrical insertion connection. A charging adapter of the present invention inserts into the port of the device. The housing secures the charging adapter within the port. The charging adapter provides two charging contacts that provide power to the battery of the device.

The charging system 100 provides a housing 104 for the electronic device 106 and a charging base 102 designed to receive the housing 104. The charging base 102 is configured to accept the housing 104 in a set orientation, preferably a charging orientation. The charging base 102 provides charging contacts that connect to a power source via power cord 108. The charging base 102 accepts housing 104 in a charging orientation that will allow for charging of the device 106.

The charging base 102 aligns charging contacts of the charging adapter with charging contacts of the charging base 102. Insertion of the housing 104 into the charging base 102 in the charging orientation completes the circuit of the charging contacts to charge the device 106.

In one embodiment, retention arms 110, 114, 120 protrude laterally from an interior portion of a first wall 130 and a second wall 132 located opposite the first wall 130. The retentions arms 110, 114, 116, 120 support the housing 104 when inserted into the charging base 102.

In one embodiment, the retention arms 110, 114, 116, 120 provide a unique shape to allow insertion of the housing 104 into the charging base 102 in a charging orientation as shown in FIGS. 1 and 2. The retention arms 110, 114, 116, 120 of such an embodiment prevent insertion of the housing 104 into the charging base 102 in orientations that will not charge device 106. Such a configuration promotes charging of device 106 when inserted into the charging station 102.

The charging base 102 provides at least two charging contacts 124, 126 for contacting the charging contacts of the charging adapter. Electricity flows from the charging base 102 to the device 106 via the charging contacts 124, 126 located within charging aperture 122. The charging aperture 122 of one embodiment is keyed to accept the insertion of at least a portion of the housing 104 where the charging adapter is located.

In one embodiment, the retention arms 110, 114, 116, 120 support the housing 104 and device 106 when the device 106 is inserted into the charging station 102. The retention arms 110, 114, 116, 120 align the charging contacts of the charging adapter with the charging contacts 124, 126 of the charging base 102. The device 106 can then charge properly without insertion of a cord into the port. The contact between the charging contacts supply sufficient power to charge the device 106 when the charging base 102 is plugged into a power source.

The power cord 108 attached to a power source supplies power to the charging contacts 124, 126 within the base. The charging station 102 is keyed to accept insertion of the device 106 in a set orientation, such as the charging orientation. The keying of the charging station 102 prevents users from incorrectly inserting the device 106 into the charging station 102. The retention arms 110, 114, 116, 120 create retention apertures 112, 118 that accept the housing 104 in the charging orientation.

The retention arms 110, 114, 116, 120 and retention apertures 112, 118 accept the housing 104 in a charging orientation. The housing 104 positioned in the charging orientation aligns the charging contacts. The retention arms 110, 114, 116, 120 prevent insertion of the housing 104 into the charging station 102 in an orientation in which the charging contacts cannot complete the circuit to transfer electricity to the device.

The charging system 100 also provides a protective housing 104 for the device 106. The housing 104 is keyed to the charging station 102 to orient the device 106 when inserting the device 106 into the charging station 102. A blocking head 164 of the housing 104 is sized not to be inserted into the receiving apertures 112, 118. In one embodiment, the blocking head 164 may be sized larger than the receiving apertures 112, 118. In another embodiment, the blocking head 164 protrudes from the housing 102 to prevent insertion.

As discussed above, the port of the device 106 is usually located at the bottom of the device 106. The charging adapter and charging contacts of such a device would also be located at the bottom of housing 104 and device 106. To complete the circuit, the charging contacts 124, 126 protrude upward from the floor 128 of the charging base 102. The blocking head 164 of such an embodiment would be located at the top of the housing 104 to prevent insertion of the top of the housing 104 into the charging stations 102.

The charging station 102 provides four walls, walls 130, 132, 134, 136. The walls 130, 132, 134, 135 provide sufficient space between the walls for insertion of the housing 104 into the charging station 102 in the charging orientation.

Figure 3:
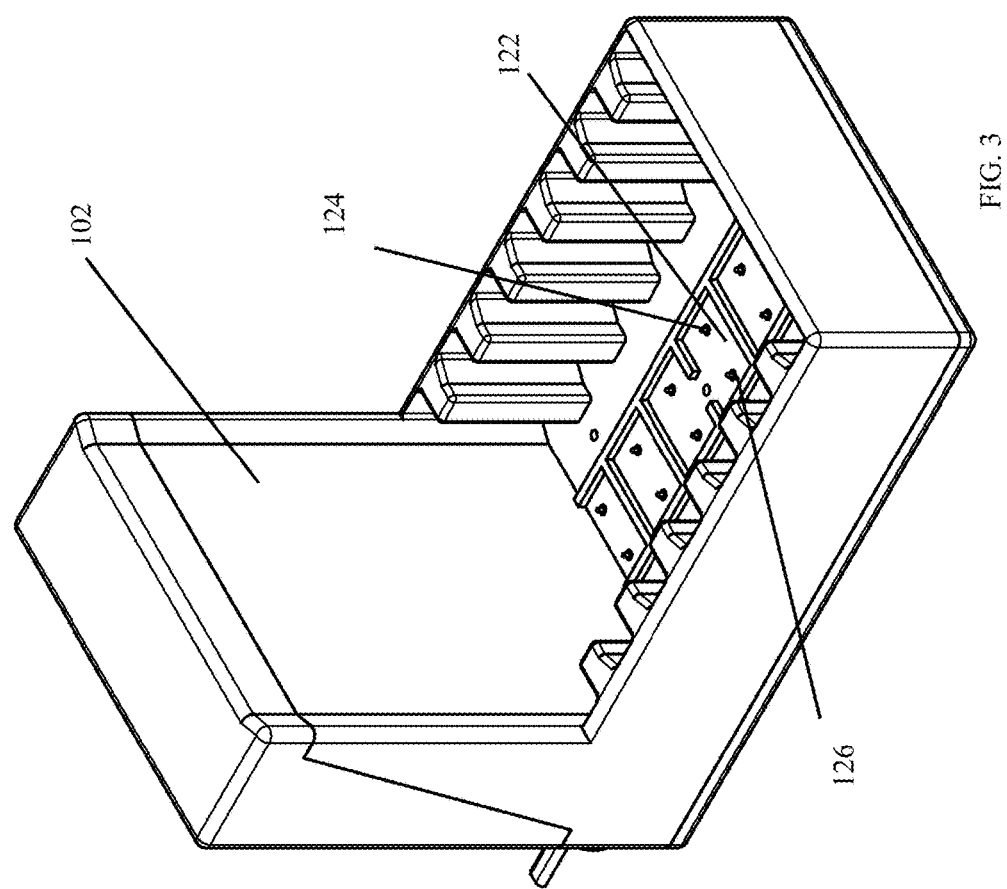
FIG. 3 is a perspective view of the charging station of one embodiment of the present invention.
Figure 4:
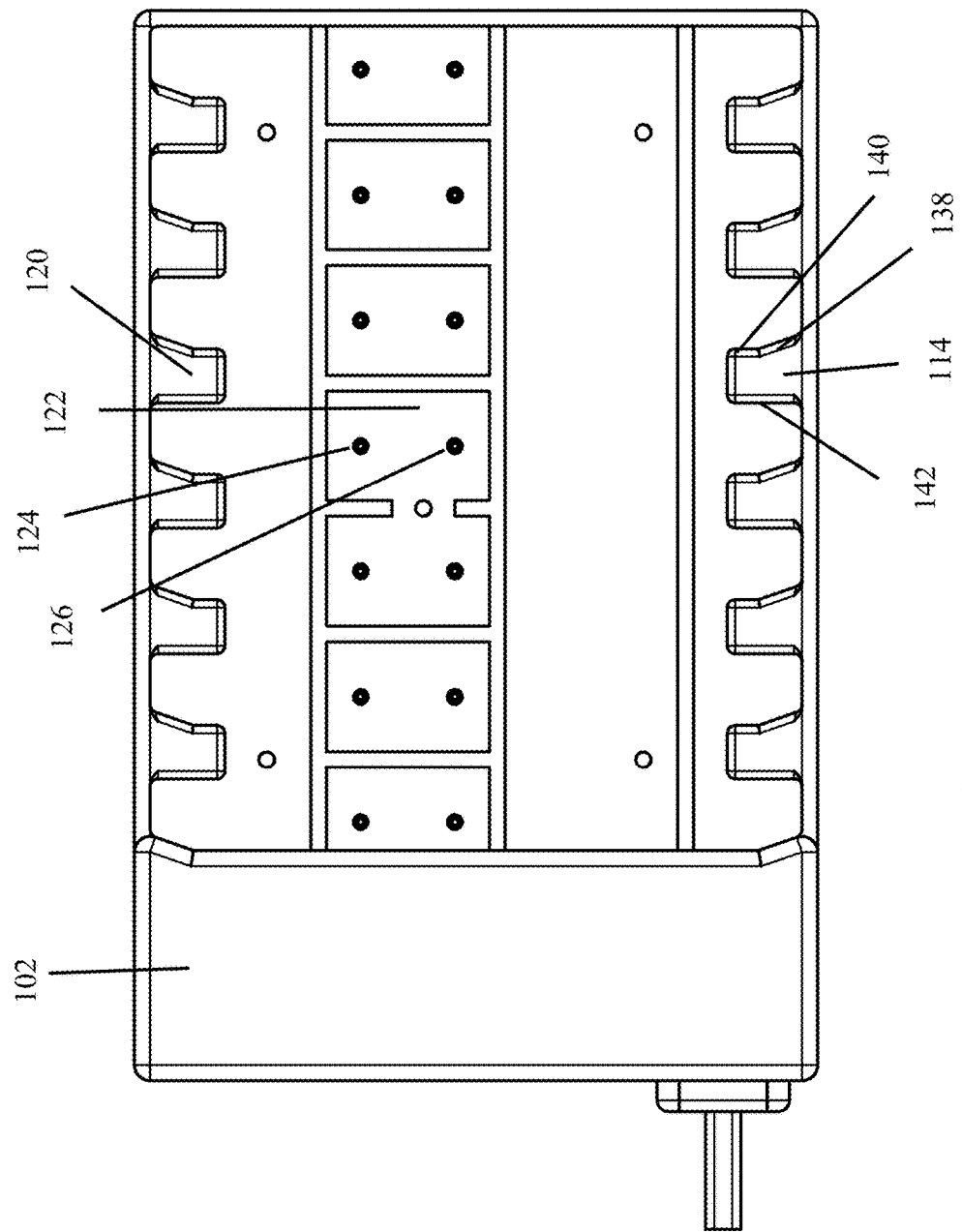
FIG. 4 is a top view thereof.

FIGS. 2-4 show the keying of the housing 104 with receiving apertures 118, 120. A bottom portion of the housing 102 is inserted into the receiving apertures 112, 118 between retention apertures 110, 114, 116, 120. Charging contacts 124, 124a, 126, 126a at charging aperture 122, 122a are exposed through the floor 128 of the charging base 102.

Blocking head 164 is sized not to pass into receiving apertures 118, 120. As shown in FIG. 2, blocking head 164 is larger than receiving apertures 118, 120. Retention arms 110, 114, 116, 120 provide a retention elbow 138, a retention finger 140, and retention back 142. Retention elbow 138 angles into the receiving aperture 118, 120 to reduce the size of the receiving apertures 118, 120. The receiving apertures 118, 120 narrow at the retention elbow 138. The reduced size of the receiving apertures 118, 120 prevents insertion of the blocking head 164 into the receiving apertures 118, 120.

FIGS. 5-8 show different views of the charging base 102. Walls 120, 132, 134, 136 define the area in which the housings may be stored. In one embodiment, power cord 108 secures to the power source for charging the devices.

Figure 9:
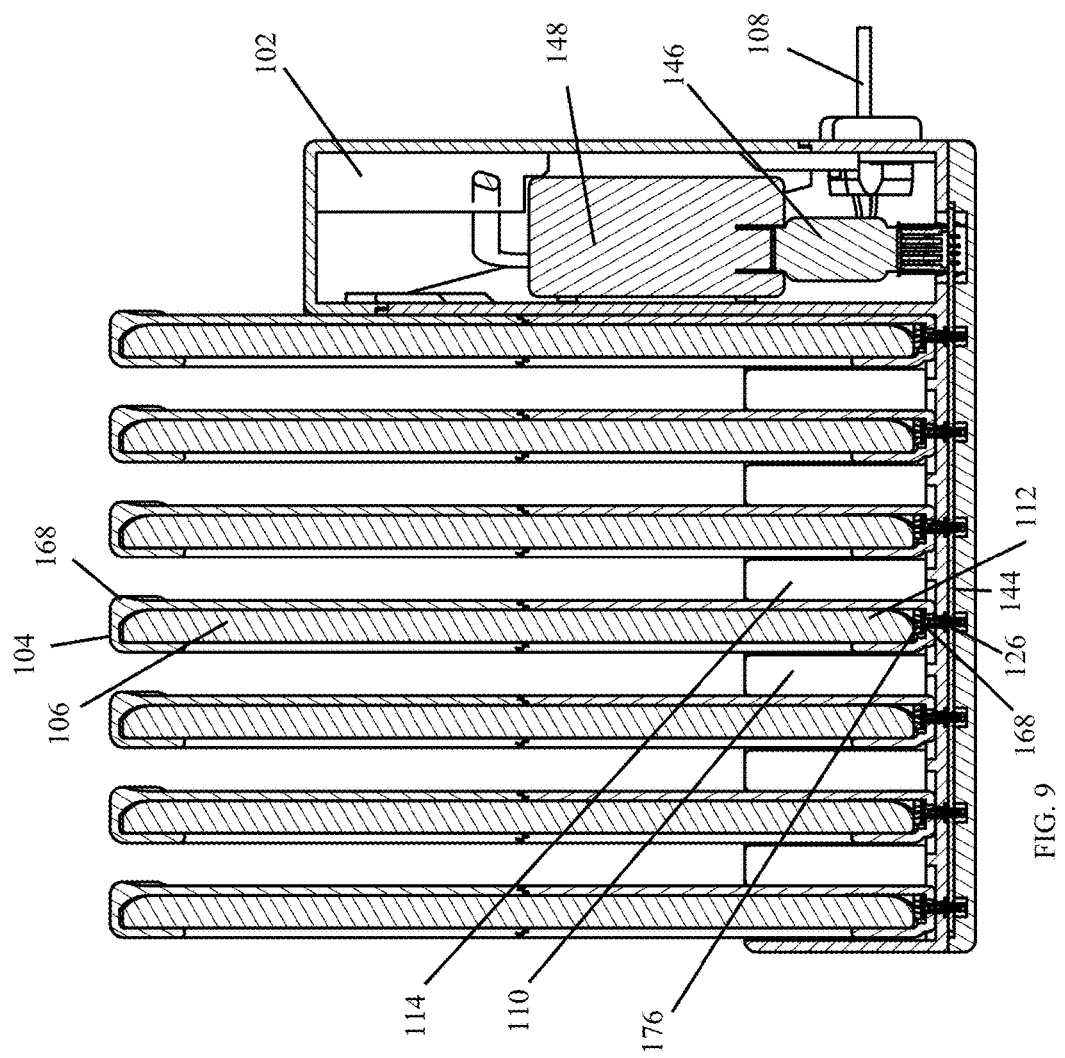
FIG. 9 is a sectional view of one embodiment of the present invention.
Figure 10:
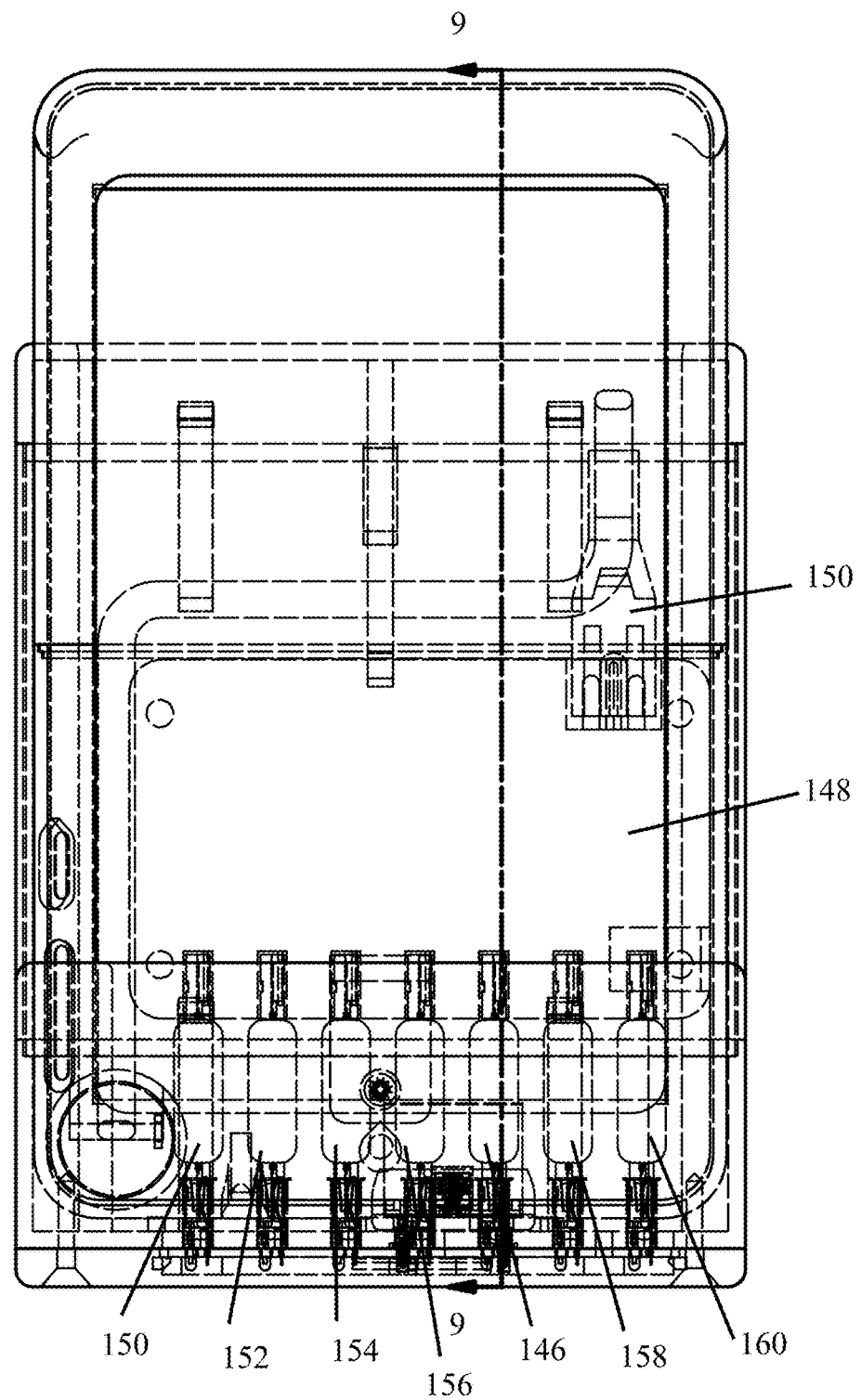
FIG. 10 is a sectional view thereof.

The charging station 102 houses the conductors and adapters needed to charge the devices as shown in FIGS. 9 and 10. The charging station 102 accepts multiple devices 106 and housings 104 for charging multiple devices 106 at a time. FIG. 9 emphasizes the fact that blocking head 168 protrudes outward to prevent insertion of the blocking head 164 into receiving aperture 112.

The retention fingers 110, 114 direct the charging adapter 174 within housing 104 towards charging contacts 126. Charging contacts 168 of charging adapter 174 complete the circuit with charging contacts 126 of the charging base 102. Completing the circuit charges the devices 106 when the charging base 102 is connected to a power source.

Conductor 144 connects the charging contacts 126 with adapter 146, such as a male to male USB adapter. Adapter 146 is inserted into charger 148 which is a multiport USB charger. Power cord 108 supplies power to charger 148 which transfers power to adapter 146. The electricity then flows through conductor 144 and charging contacts 126 to charging adapter 176.

Figure 11:
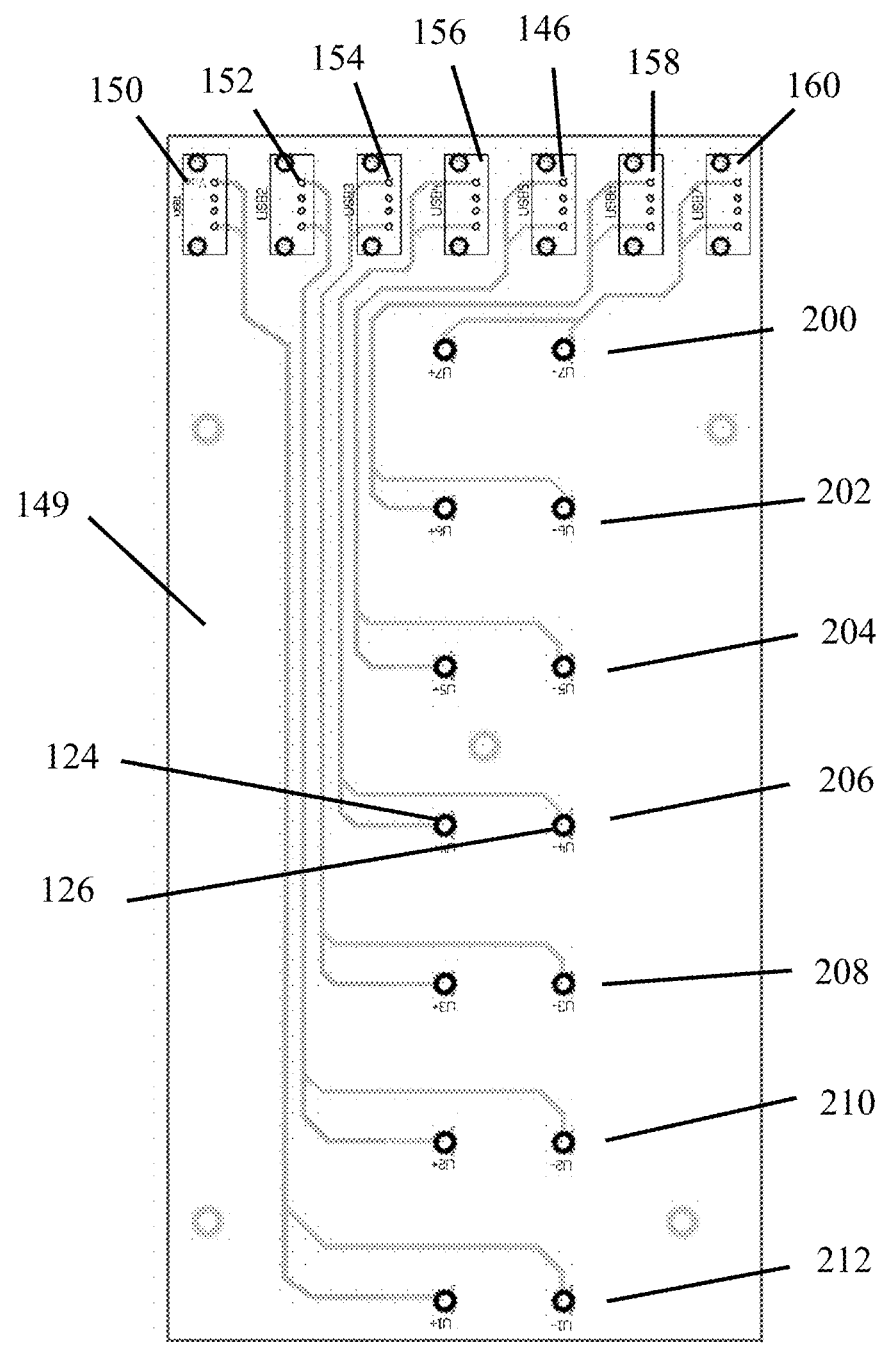
FIG. 11 is a schematic view of one embodiment of the present invention.
Figure 12:
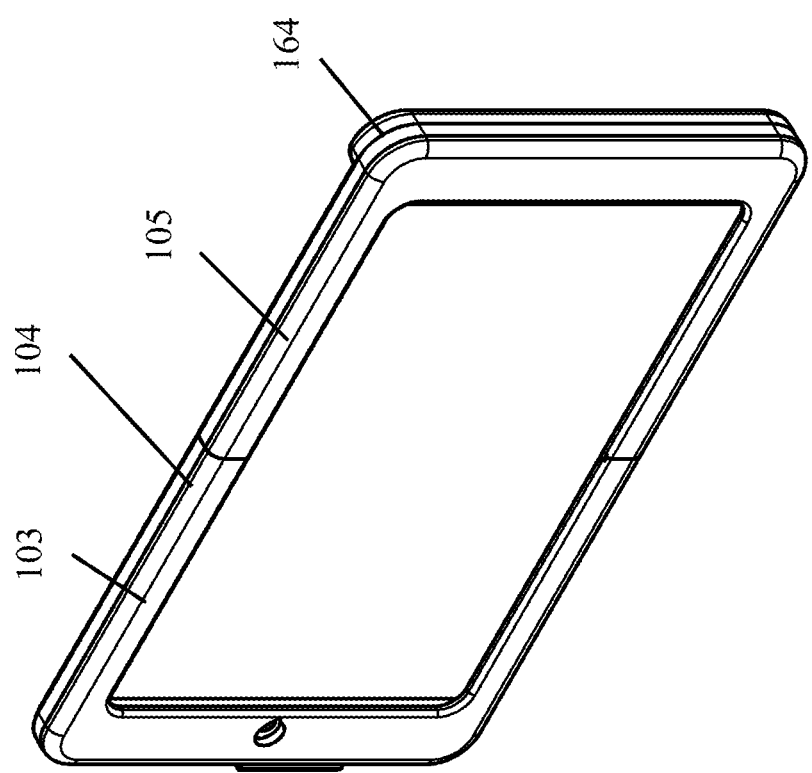
FIG. 12 is a perspective view of a housing of one embodiment of the present invention.
Figure 18:
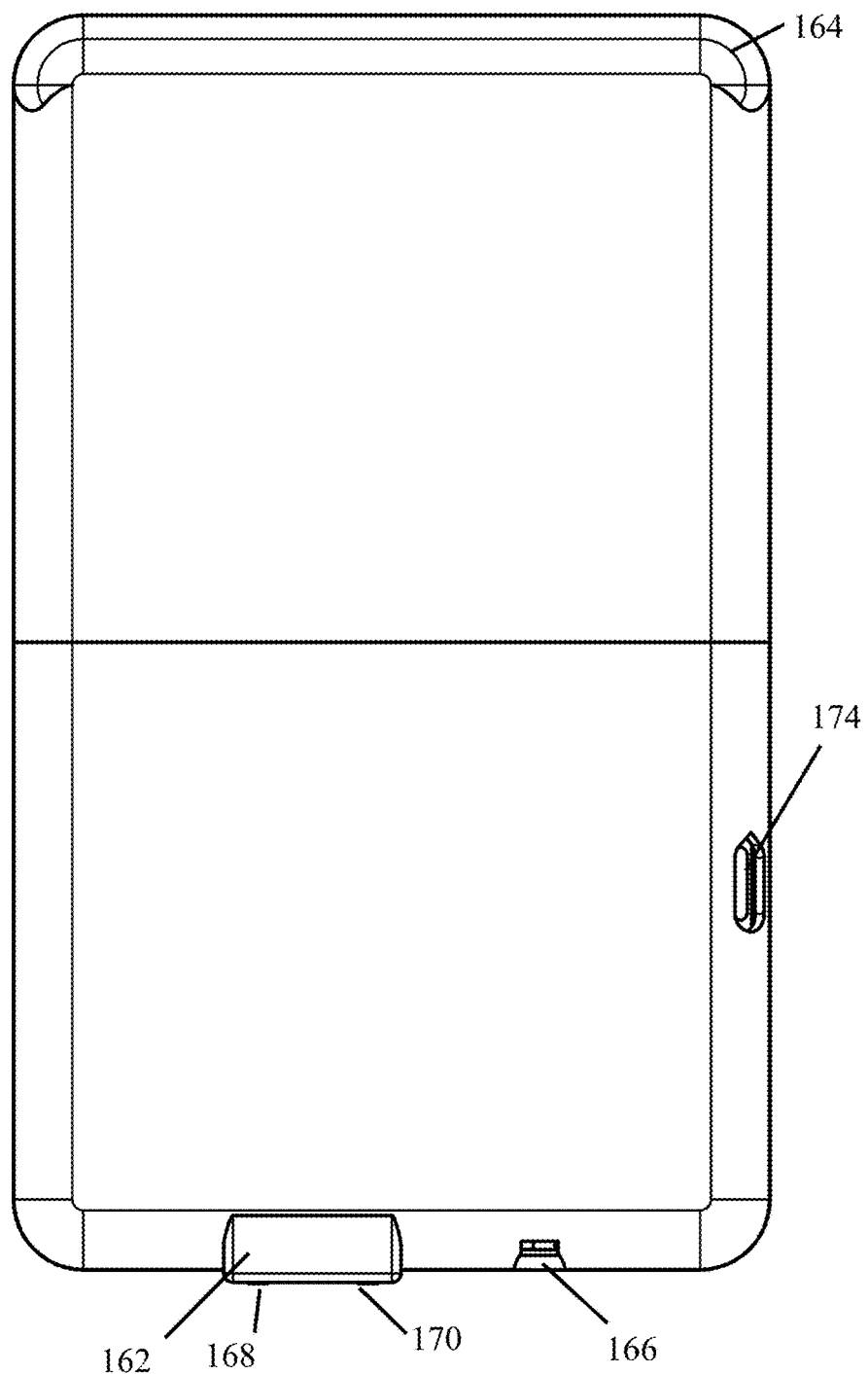
FIG. 18 is a rear view thereof.

FIGS. 10-11 show the connection of adapters 146, 150, 152, 154, 156, 158, 160 into the charger 148. Power cord 150 plugs into charger 148. Each adapter 146, 150, 152, 154, 156, 158, 160 attaches to conductors that supply power to charging contacts 124, 126.

As shown in FIG. 11, conductors connect each adapter 146, 150, 152, 154, 156, 158, 160 to sets of charging contacts 200, 202, 204, 206, 208, 210, 212. Each adapter 146, 150, 152, 154, 156, 158, 160 attaches to two conductors which attach to each charging contact of the set of charging contacts. Each set of charging contacts 200, 202, 204, 206, 208, 210, 212 provides a charging contact similar to charging contacts 124, 126. The set of charging contacts 200, 202, 204, 206, 208, 210, 212 complete an electric circuit with the charging adapter to charge the device.

FIGS. 12-18 show the housing 104 that at least partially encloses the device. The housing of one embodiment provides a lower body 103 and an upper body 105. The housing of other embodiments may be constructed from a variation of other designed pieces to at least partially encase the device. The housing 104 protects the device 106 from damage. The housing 104 also prevents access to certain features of the device 106. Eliminating access to these features prevents users from gaining unauthorized access to the device 106. The housing 104 also prevents users from resetting the device 106 to allow unfettered access to the user.

In one embodiment, the housing is constructed from a rigid material. A shock absorbing material may be added to the housing to provide additional support. In one embodiment, the housing is constructed from a hard plastic. The housing could also be constructed from aluminum or other metal. The housing is constructed from a material that will adequately protect the device. The housing of one embodiment is also constructed from material sufficient to prevent access to some features of the device.

The housing 104 of one embodiment is designed to be tamper proof. While certain housings and cases are designed to be removed and reinstalled, the housing 104 of one embodiment is designed to be difficult to remove. The lower body 103 and upper body 105 are secured to each other with an adhesive or welded together to deter removal of the housing 104. Other embodiments may secure the housing together via security screws, keyed locks, and/or other tamper proofing methods.

If a user removes the housing 104, the users will recognize that the housing has been removed. The users can then reset the device to the appropriate settings and reattach the housing 104.

As discussed above, blocking head 164 protrudes outward from the housing. In such an embodiment, the top of the housing 104 has a larger surface area then that bottom of the housing. The housing provides apertures 166, 172, 174 that enable access to the device 106. In one embodiment, apertures 166, 172, 174 provide access to such features as the power button, audio output, and the camera. Aperture 166 provides access to the line out port for audio output. Aperture 172 provides access to the camera. Aperture 174 provides access to the power button.

The housing of one embodiment blocks buttons, inputs, and other access to the device. Some tablets and mobile computing devices allow a user to access particular features through such buttons and inputs. Limiting access to such buttons and inputs prevents users from reconfiguring the device or otherwise accessing disables features of the device. The housing may block such buttons as the windows button and the volume controls. The housing may also block such inputs such as the charging/communication port and the storage slots that allow a user to increase the storage capacity of the device.

Foot 162 of housing 104 is keyed to fit within charging aperture 122. Foot 162 aligns charging contacts 168, 170 with charging contacts 124, 126. As discussed above, aligning charging contacts 124, 126, 168, 170 complete the circuit to allow charging of the device.

Figure 19:
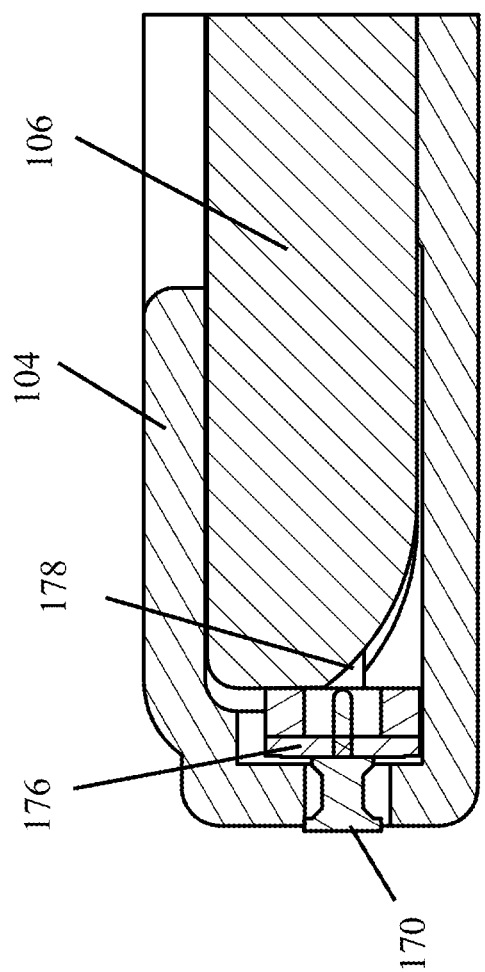
FIG. 19 is a sectional view thereof.
Figure 20:
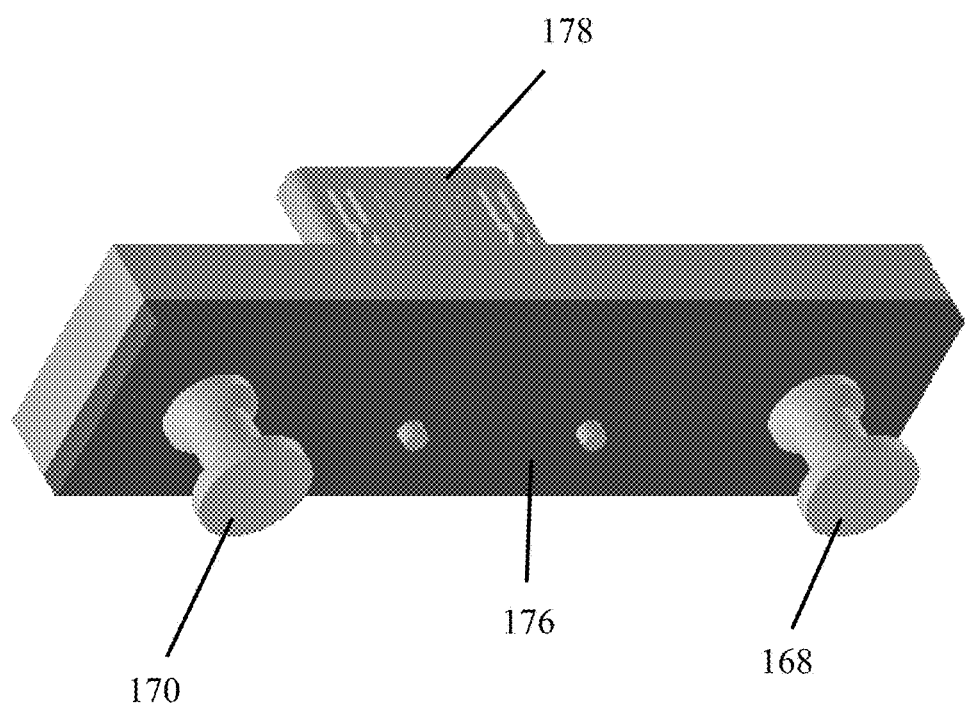
FIG. 20 is a perspective view of a charging adapter of one embodiment of the present invention.

FIGS. 19 and 20 show the charging adapter 176 and securing the charging adapter 176 within device 106. The charging adapter 176 is secured within the housing 104 to enable charging of the device. Male plug 178 inserts into the port of the device 106. Charging contacts 168, 170 of the charging adapter 174 extend into an aperture of the housing 104. The aperture of the housing enables the charging contacts 124, 126, 168, 170 to complete the circuit for charging the device 106.

The charging contacts and orientations have been shown in one manner. The placement of the charging contacts may vary according to the placement of the port and the size of the station. The charging station may be configured to accept the electronic device in other orientations that will allow for charging of the device.

The charging station may also serve as storage of the devices. The devices may be placed into the charging station and then locked within the charging station. Locking the devices in the charging station prevents unauthorized access and securely stores the devices within the charging station.

The charging station may also be implemented as a mobile charging station. Wheels may be attached to the charging station to assist with transporting the devices and the charging station. The wheels increase the mobility of the charging station. A handle may also be attached to the charging station for maneuvering the charging station.

In one embodiment, the electronic device may provide charging contacts without the charging adapter. The housing of such an embodiment provides an aperture that exposes the charging contacts for contact with the charging station. The housing may also be the casing that encases the internal components of the device.

FIGS. 21-26 show another embodiment of the charging station as secure storage base 180. Base 180 communicates with a server, such as a computer, to identify whether a particular device should be unlocked from the base 180. The base and server may communicate wirelessly or through a wired connection. Such communication may also occur across a network or across the Internet. A wireless communication device, including but not limited to NFC, WiFi, Bluetooth, and other wireless devices, may be provided with the base to allow wireless communication with the server.

Housing 184, shown in FIG. 21, at least partially encases an electronic device 183, such as tablets, smart phones, mobile computing devices, mobile electronic devices, and other electronic devices. The housing 184 inserts into secure base 180. A lock, such as a locking finger, locking magnet, locking device, or other locking mechanism, secures the electronic device within base 180. The lock may contact the electronic device or a housing at least partially encasing the electronic device. The lock may insert into an aperture of the device or the housing to secure the electronic device within the base.

In another embodiment, the lock contacts the device to prevent removal of the device from the base. The lock may be a locking finger that contacts the device. The locking finger adjusts between locked and unlocked. When locked, the locking finger is positioned above the charging end to contact the side of the device opposite of the charging side. When unlocked, the locking finger adjusts to allow removal of the device from the base. Such a version of the lock enables the lock to function without requiring a locking aperture.

In another embodiment, the base prevents removal of the device. The lock may pivot to prevent removal of the device from the base. The lock pivots between locked and unlocked. When locked, the lock is pivoted to secure the device within the base. When unlocked, the lock pivots to a position to enable removal of the device from the base. The removal of the device depends on the rotation of the lock.

In another embodiment, the lock may be implemented as a latch. The latch secures the device within the base. The latch adjusts between locked and unlocked.

The lock may also be a magnetic lock that adjusts between locked and unlocked. The lock secures the device within the base via the magnet. In one embodiment, the magnet secures the device within the base. The magnet may then be adjusted or deactivated for removal of the device from the base. In another embodiment, the magnet may attract and repel a locking finger for securing the device. The magnet may be an energized electromagnet that secures the device. De-energizing the magnet enables removal of the device from the base.

The lock may also be a screw lock, twist lock, or hook lock. The screw lock twists into the mated locking aperture of the device or housing. In another embodiment, the screw lock may insert into a hole with the base. With the twist lock, a key inserts into a keyed hole and rotated for alignment with the keyed hole for removal of the device from the base. With the hook lock, a small hook rotates in a mating locking aperture on the device or housing.

Locking finger 182 inserts into a locking aperture 185 of housing 184 to secure the device 183 and housing 184 within base 180. The locking finger 185 adjusts between locked and unlocked. When locked, the locking finger 182 locks the device 183 within the base 180. The locking finger 182 when unlocked releases the device 183 from the base 180 to provide the user with access to the device 183.

In other embodiments, the locking finger 182 may insert directly into the locking aperture 185 of the device 183 to secure the device within the base. In another embodiment, the locking finger 182 may simply contact the device to secure the device within the base.

FIG. 22 shows an embodiment of base 180 capable of storing multiple electronic devices within base 180. The base 180 may store one device or multiple devices. In one embodiment, the base 180 receives housing 184 similar to the housing 104 described above for the charging station.

FIG. 22 also shows the access status or charging status with a status light 186. The status light 186 indicates whether the device is available for access. In one embodiment, each light 186 represents access to a device. The status light 186 may be on or off depending on whether the user can access the device 183 associated with the light 186. In another embodiment, the color of the light 186 may indicate whether the user may access the device 183.

In another embodiment, the status light 186 indicates whether the device 183 is charged or charging. As discussed above, the status light may be on indicating that the device is charging. In another embodiment, the status light may be on indicating that the device is fully charged. Another embodiment may change the color of the status light to indicate whether the device 183 is charging or fully charged. The status light may also identify the the device assigned by the system for the user to access and remove from the base.

Figure 23:
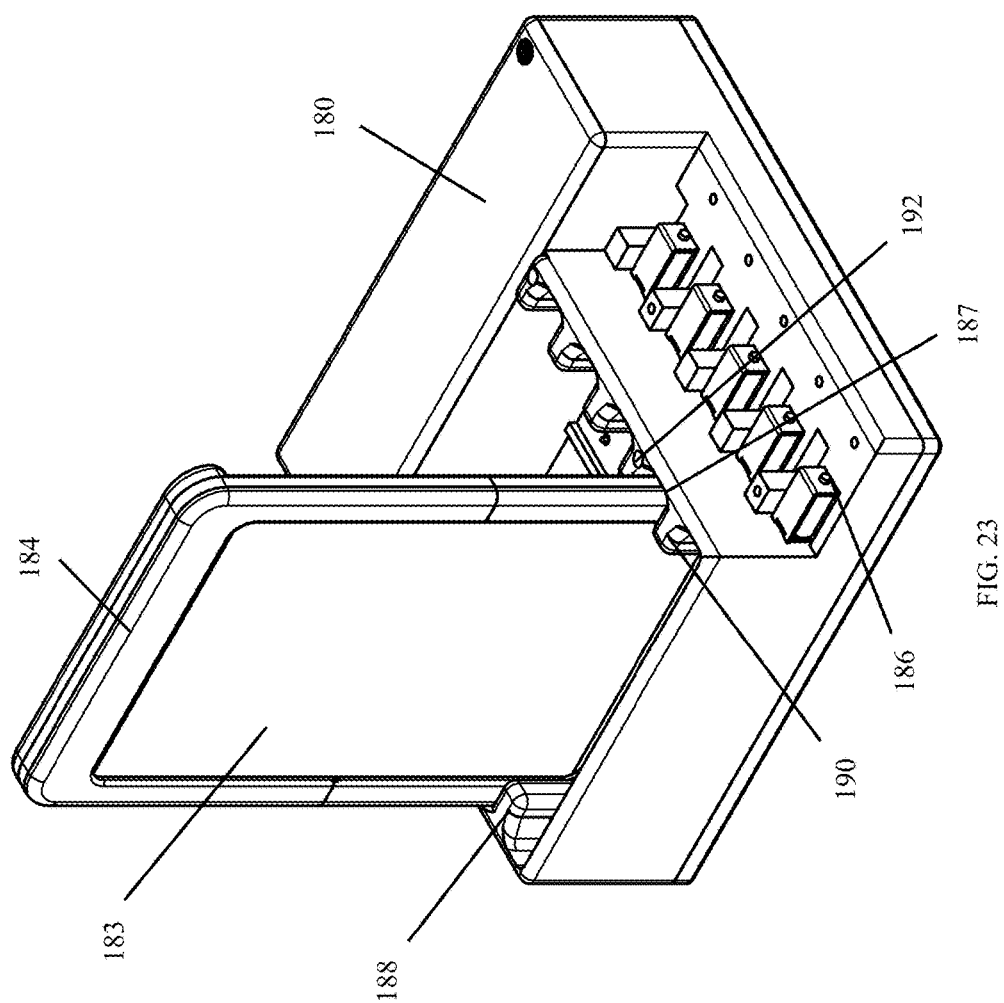
FIG. 23 is a perspective view thereof.
Figure 24:
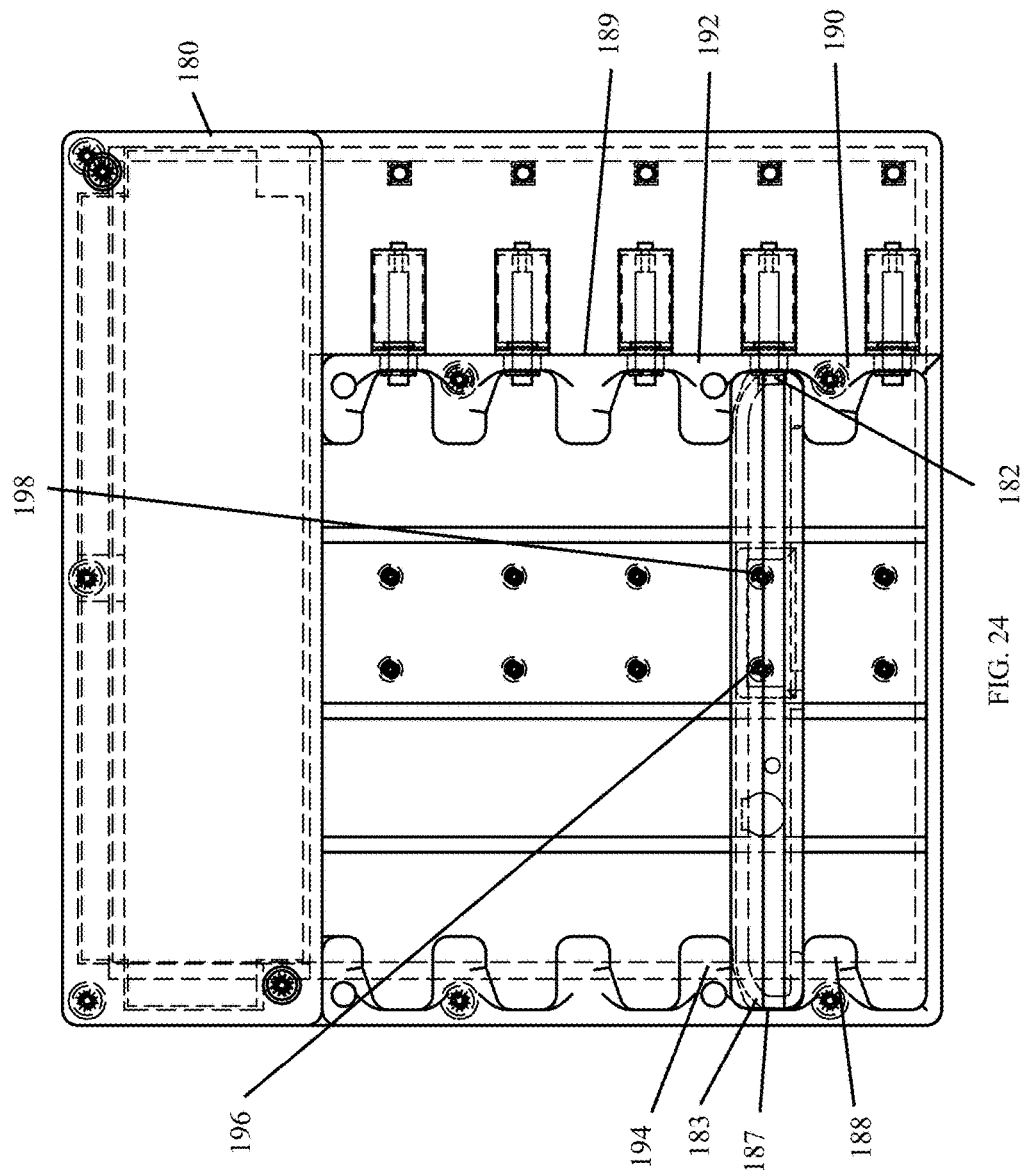
FIG. 24 is a partial view thereof.

FIGS. 23 and 24 show base 180 with device 183 and housing 184 inserted to receiving aperture 187 of base 180. The retention aperture 187 accepts insertion of the device 183 into the base 180 between retention arms 188, 190, 192, 194. The charging contacts 196, 198 located in retention aperture 187 charges the device. The retention apertures 187 and retention arms 188, 190, 192, 194 discussed in this embodiment may be similar to the retention apertures 112, 118 and retention arms 112, 114, 116, 118 discussed above.

The locking finger 182 adjusts between locked and unlocked. The locking finger 182 may be a solenoid, actuator, or other locking device. The locking finger 182 extends and retracts from a side wall 189. The locking finger 182 retracts within wall 189 to unlock the device. The locking finger 182 extends from wall 189 towards receiving aperture 187.

Figure 25:
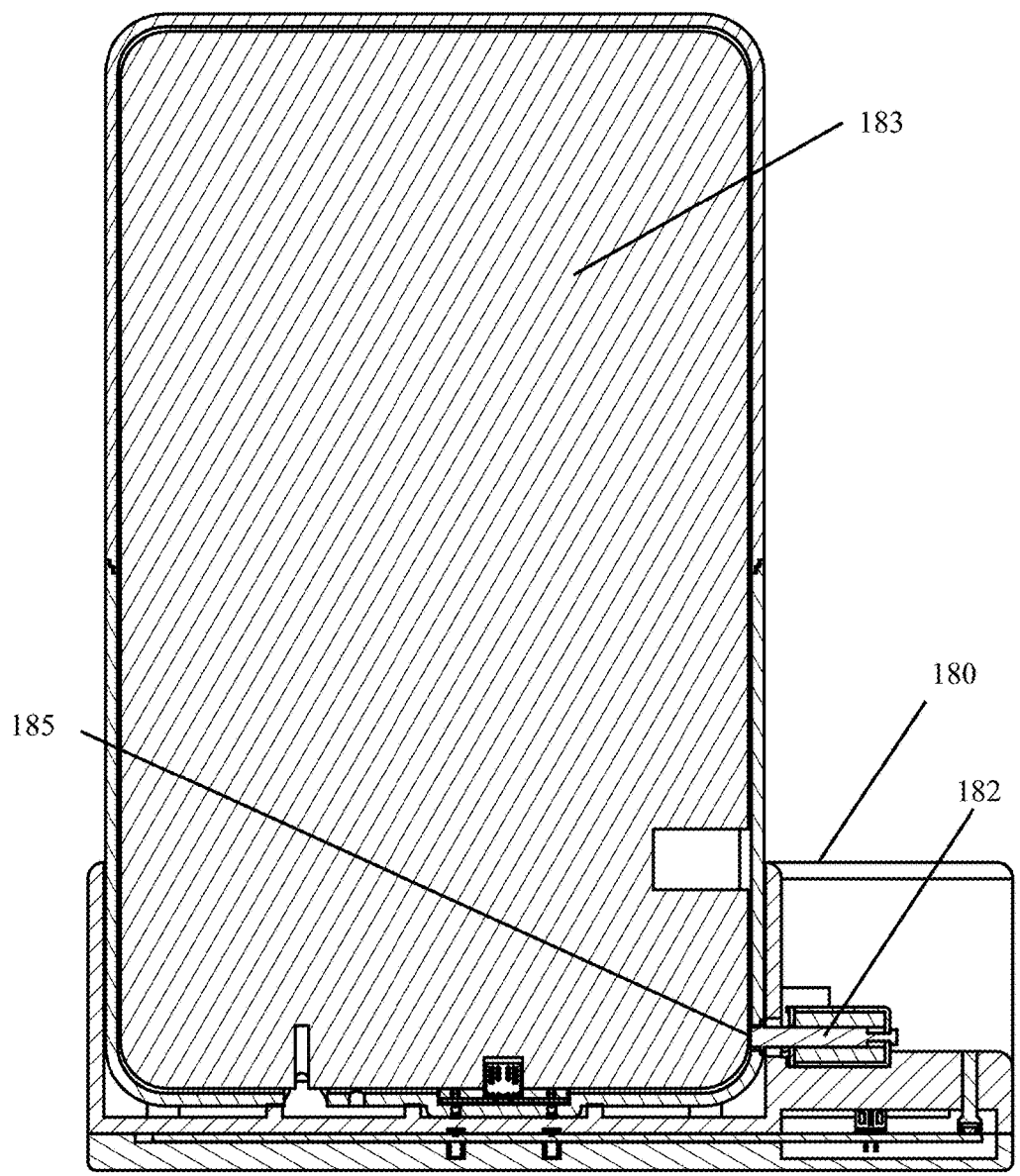
FIG. 25 is a partial view thereof.
Figure 26:
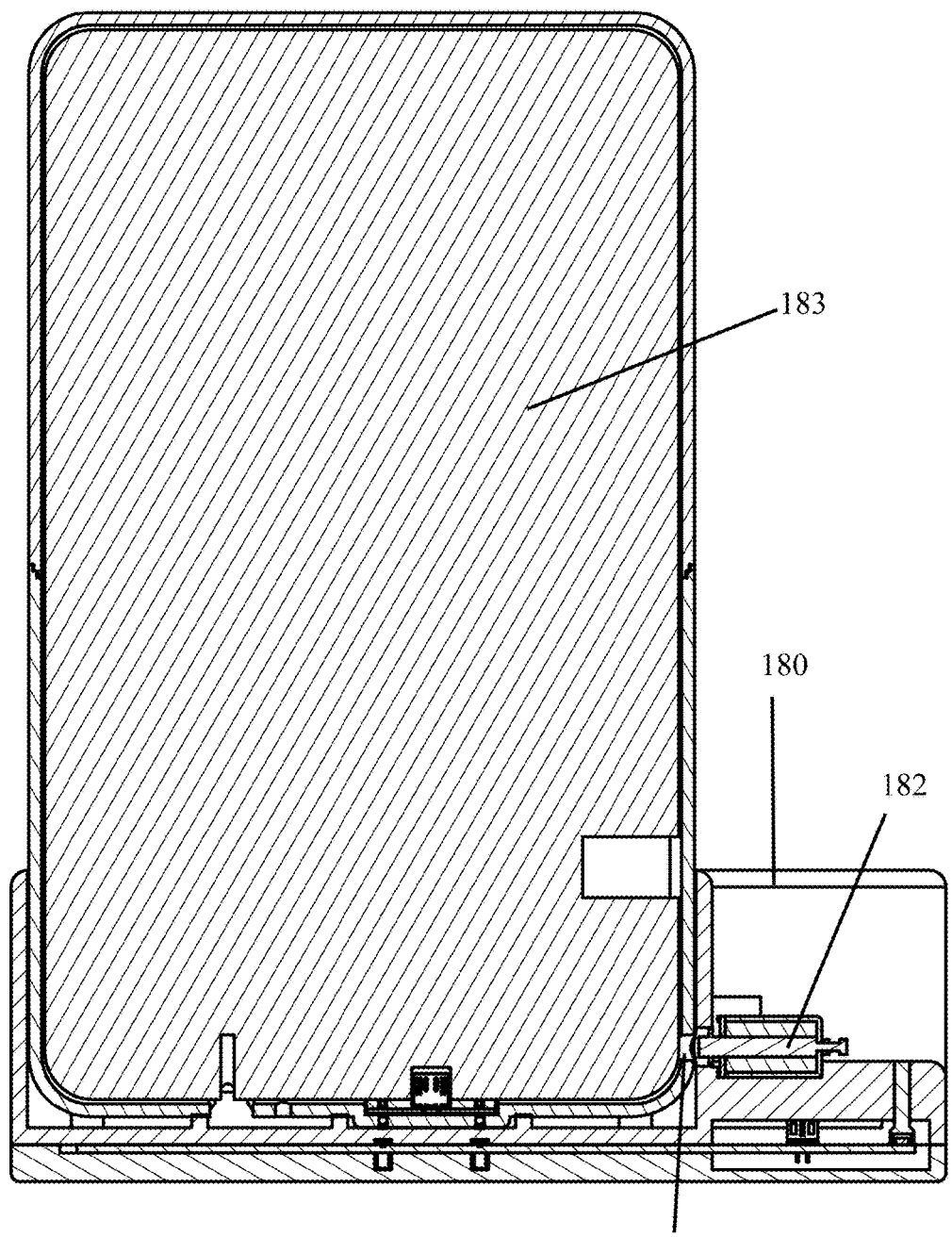
FIG. 26 is a partial view thereof.

FIGS. 25 and 26 show the device 183 secured within base 180. The locking finger 182 contacts the device 183 to secure the device 183 within the base 180. Such an embodiment enables the base 180 to secure devices 183 that are not stored within a case, such as housing 184. The locking finger of one embodiment inserts into the locking aperture 185 of device 183 to secure the device within the base. In another embodiment, the locking finger 182 inserts into locking aperture 185 of housing 184 and contacts device 183 to secure the device within base 180. The locking finger 182 of another embodiment may insert into locking aperture 185 of housing 184 such that the locking finger 182 is not required to contact device 183 to secure the device 183 within the base 180. Contact of the locking finger 182 with the device 183 or the housing 184 is sufficient to secure the device within the base.

FIG. 26 shows the locking finger 182 retracting to unlock the device. The locking finger 182 no longer contacts the device 183 or the housing 184. The locking finger 182 also retracts from locking aperture 185. The device 183 is no longer secured within base 180. The user can freely remove the device 183 from base 180.

The locking finger 182 has been described as contacting the device 183 or being inserted into locking aperture 185. The locking aperture 185 may be implemented in a case in which the electronic device 183 is inserted. In another embodiment, the locking aperture 185 may be implemented in device 183. Such a locking aperture secures the device when the locking finger inserts into locking aperture of either the device or a separate housing secured to the device.

Access to the device secured within the base may be granted upon certain conditions and/or rules. The system tracks usage of the devices and the status of the user. Such status of the user may be based upon the user's behavior, the user's prior usage of the device, and the user's position in the hierarchy of accessing a device. The server identifies which users should be granted access to the device. The server assigns a particular device to a user. The server transmits a message to the base identifying the device to be unlocked for the user. The server maintains a log of the devices that have been accessed by the users.

Figure 27:
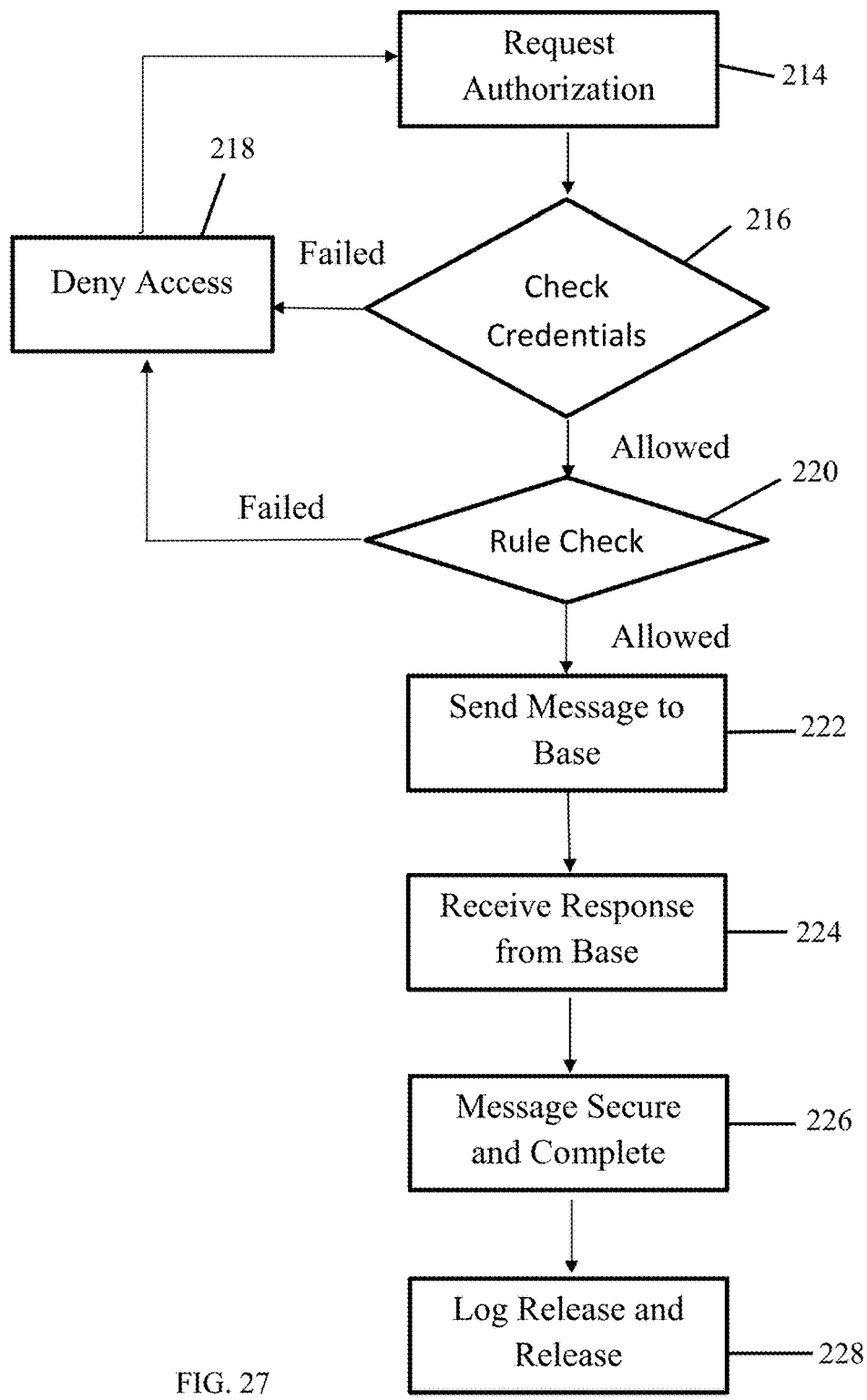
FIG. 27 is a flow chart view of one embodiment of the present invention.
Figure 28:
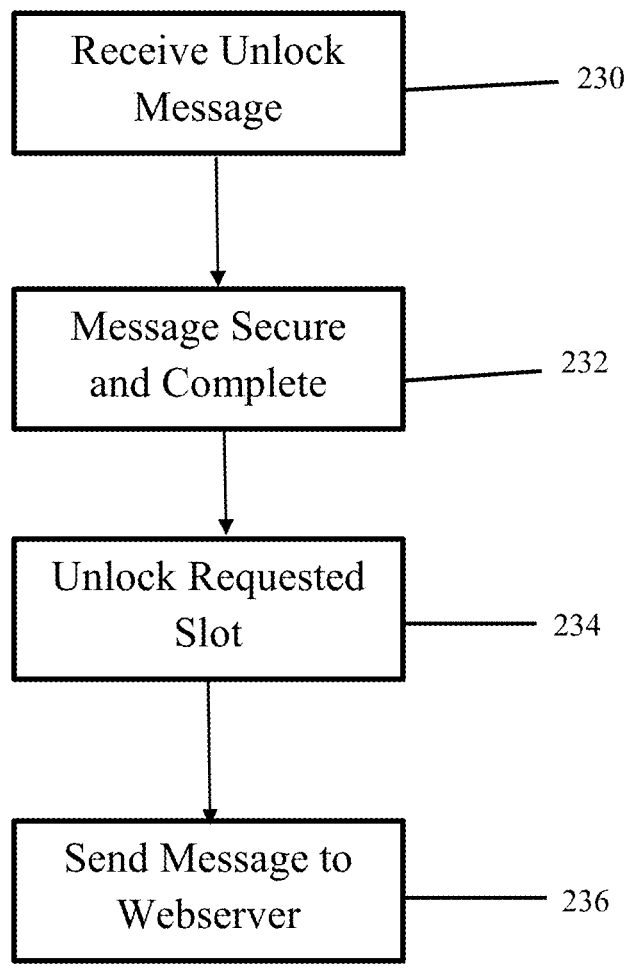
FIG. 28 is a flow chart view thereof.

To release a device from the base, a user must enter a proper authorization code as shown in FIGS. 27 and 28. FIG. 27 shows the processes occurring on the server to access the device. FIG. 28 shows the processes occurring on the base to access the device. The secured storage grants access to the user who provides the proper credentials and identification. The system includes a server, such as a computer or other computing device, in communication with the base. The system requests authorization from the user to access the device from secured storage at Request Authorization step 214. The user enters the user's identification and/or password to receive the device. The server authenticates the user's identification via such authentication methods which include, but are not limited to, password, PIN number, fingerprint, voice recognition, retinal scan, facial recognition, biometrics, or other authentication methods.

The server determines whether a proper identification has been entered at Check Credentials step 216. The server determines whether a proper user has attempted to access a secure device. If the credential check fails, the system denies the user access to a device at Deny Access 218. The system then requests authorization again at Request Authorization step 214. In one embodiment, the system may lock the user out by limiting the number of tries a user can attempt to access the device. The system may require the user to wait a specific amount of time before allowing the user to attempt unlocking the device.

If the user enters a proper identification, the server then determines whether the user should be allowed access to the device. The server checks the user and compares the user's identification against a set of rules or other criteria to determine if the system should allow the user access to a device at Rule Check 220. In one embodiment, the system compares the user's identification to an authorized list of users allowed access to the devices. The system defines rules determining whether to grant the user with access to a device. Such rules can include whether the device belongs to the user or whether the user should be granted access to a particular device.

The rules can include whether the device is sufficiently charged or in otherwise proper operating condition. The rules can define a minimum charge of the device. If the device is not charged to the minimum charge, the system denies access to the device. Such a charge may be based on the battery power of the device.

The rules may also be based upon rules or guidelines set forth by an institution, a school, a library, a prison, a jail, a detention center, a learning center, a business, a place of learning, or a place of confinement. The system may allow access to the device to users with good behavior, users who have time remaining to access a device, users who have not abused the devices, users who have not damaged devices, users who have not lost or stolen devices, or users who have not otherwise abused the system. The system may prevent access to the devices to those users who have poor behavior, users who no remaining access time for a device, users who have abused the devices, users who have lost or stolen devices, or users who have otherwise abused the system. The system may also deny access to the devices if insufficient devices remain and a user placed higher in the hierarchy is also attempting to access a device.

The system may deny access if a user has exceeded an available access limit. The system defines a set amount of time for which the user can access the device. The system tracks the amount of time a user has accessed the device from the base. If the user exceeds the available access limit, the server denies access to the device. The server confirms that the user has available access time remaining before releasing the device to the user.

The system may also restrict access to certain time periods. If a user attempts to access a device outside of the available access time, the system denies access to the device. The system will allow access to the devices if the user accesses the device during the available access times.

At Rule Check 220, the system determines whether the user is approved to access a device. If the rules indicate that a user should not be allowed access, the system denies the user access to a device at Deny Access 218. The system then requests authorization from a different user at Request Authorization 214. As discussed above, the system may require the user to wait a specific amount of time before allowing the user to attempt unlocking the device.

If the user is allowed access at Rule Check 220, the system sends a message to the base indicating that the user is granted access to the base at Send Message to Base 222. The message includes an authorization for the user to access a device. In one embodiment, the message identifies a particular device that is assigned to the user. The message may include the identification of the slot in which the assigned device is stored. The base may then unlock the slot for accessing the assigned device.

The base then sends the system a message indicating that the base has received the message from the system. The message includes confirmation receipt of the message from the server. The message also includes confirmation that the base will unlock a particular device located at a particular slot.

At Message Secure and Complete 226, the server has received the message from the base. The server confirms the authenticity of the message from the base. The server also confirms that the authentic message is the complete message from the base. The server logs release information concerning the unlocked device at Log Release and Release 228. The information includes the user who accessed the device, the device ID assigned to the user, and the time that the device was released from the base. Such information allows administrators, staff, or others to identify which devices have been released. The server logs the identification of device and the identification of the user who accessed the device from the base. Such information enables the system to account for which users last accessed a particular device. The institution may then hold users accountable for devices accessed by the users.

Referring to FIG. 28, the base proceeds through the process of unlocking a device for access by the user. The base receives an unlock message from the server at the Receive Unlock Message 230. At Message Secure and Complete 232, the base confirms the authenticity of the message from the server. The base also confirms that the message from the server is complete. If the base confirms that the message from the server is complete and authentic, the base proceeds with unlocking the device. The base unlocks the device at the requested slot, such as a receiving aperture, at Unlock Requested Slot 234.

The base unlocks the device identified by the server. In another embodiment, the base may assign the device to be unlocked and transmits the device identifier associated with the device so that the server can log the device identifier and the user who accessed the device.

The base unlocks the device assigned to the user. The locking finger retracts to unlock the device. The user then removes the unlocked device from the identified slot of the base.

In one embodiment, the system may activate the screen of the device assigned to the user to allow the user to identify the unlocked device. In another embodiment, the system may display a message on the unlocked device assigned to the user. In another embodiment, the system may display a message on the devices for which the user is not granted access. In one embodiment, the system may simply display a message on the most visible device, such as the device placed in the most front position.

The retention fingers 188, 190, 192, 194 may be keyed to align the locking aperture 185 with the locking finger. Such alignment enables the insertion of the device into the base in the proper orientation for securing the device within the base. The keyed retention fingers with the locking finger reduce the possibility that the device may be inserted into the base improperly. The keyed retention fingers increase the likelihood that the device will be properly secured within the base.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A base apparatus for securing multiple mobile computing devices stored within the base, the apparatus comprising:
   a base that accepts at least a portion of the mobile computing device wherein the base restricts access to the mobile computing device;
   a first wall extending vertically above the base;
   a second wall extending vertically above the base, the second wall located opposite the first wall;
   a receiving aperture of the base accepting insertion of the mobile computing device within the receiving aperture wherein the receiving aperture defined by an interior portion of the first wall and an interior portion of the second wall;
   a lock secures the device within the base when locked and the lock releasing the device from the base when unlocked;
   a server in communication with the base wherein the server requires authentication from a user prior to unlocking a device for removal from the base, the server transmitting an unlock message to the base informing the base to unlock a device if the user is authorized to access the device;
   at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;
   the lock unlocking to release the device from the base after receiving the unlock message;
   a rule list identifying at least one rule required to be met to allow access to the device wherein the rule identifies an available access time at which the device should be released from the base;
   the server restricting access to the device to the available access time wherein the server compares an access time at which the user attempts to access the device to the available access time to determine whether the device should be released from the base, the server transmitting the unlock message to the base if the access time is within the available access time wherein the server denies access to the device outside of the available access time.

2. A base apparatus for securing multiple mobile computing devices stored within the base, the apparatus comprising:
   a base that accepts at least a portion of the mobile computing device wherein the base restricts access to the mobile computing device;
   a first wall extending vertically above the base;
   a second wall extending vertically above the base, the second wall located opposite the first wall;
   a receiving aperture of the base accepting insertion of the mobile computing device within the receiving aperture wherein the receiving aperture defined by an interior portion of the first wall and an interior portion of the second wall;

a lock secures the device within the base when locked and the lock releasing the device from the base when unlocked;

a server in communication with the base wherein the server requires authentication from a user prior to unlocking a device for removal from the base, the server transmitting an unlock message to the base informing the base to unlock a device if the user is authorized to access the device;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies available access limits defining the amount of time a user may access the device;

the server confirming that the user has not exceeded the available access limits to determine whether the device should be released from the base, the server transmitting the unlock message to the base if the user is within available access limits, the server denying access if the user has exceeded the available access limits.

3. A base apparatus for securing multiple mobile computing devices stored within the base, the apparatus comprising:

a base that accepts at least a portion of the mobile computing device wherein the base restricts access to the mobile computing device;

a first wall extending vertically above the base;

a second wall extending vertically above the base, the second wall located opposite the first wall;

a receiving aperture of the base accepting insertion of the mobile computing device within the receiving aperture wherein the receiving aperture defined by an interior portion of the first wall and an interior portion of the second wall;

a lock secures the device within the base when locked and the lock releasing the device from the base when unlocked;

a server in communication with the base wherein the server requires authentication from a user prior to unlocking a device for removal from the base, the server transmitting an unlock message to the base informing the base to unlock a device if the user is authorized to access the device;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies a minimum charge of the device required to release the device from the base;

the server denying access to the device if the charge of the device is less than the minimum charge, the server transmitting the unlock message to the base if the charge of the device is greater than the minimum charge.

4. A base apparatus for securing multiple mobile computing devices stored within the base, the apparatus comprising:

a base that accepts at least a portion of the mobile computing device wherein the base restricts access to the mobile computing device;

a first wall extending vertically above the base;

a second wall extending vertically above the base, the second wall located opposite the first wall;

a receiving aperture of the base accepting insertion of the mobile computing device within the receiving aperture wherein the receiving aperture defined by an interior portion of the first wall and an interior portion of the second wall;

a lock secures the device within the base when locked and the lock releasing the device from the base when unlocked;

a server in communication with the base wherein the server requires authentication from a user prior to unlocking a device for removal from the base, the server transmitting an unlock message to the base informing the base to unlock a device if the user is authorized to access the device;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies a damaged status of the device;

the server restricting access to the device if the damaged status indicates that the device is damaged, the server transmitting the unlock message to the base if the device is not damaged wherein the server denies access to the device if the device is damaged.

5. A base apparatus for securing a mobile computing device stored within the base, the apparatus comprising:

a base that accepts at least a portion of the mobile computing device wherein the base restricts access to the mobile computing device;

a lock that secures the device within the base when locked and the lock releases the device from the base when unlocked;

a server in communication with the base wherein the server requires authentication from a user prior to unlocking a device for removal from the base, the server transmitting an unlock message to the base instructing the base to unlock the device from the base;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies an available access time at which the device should be released from the base;

the server restricting access to the device to the available access time wherein the server compares an access time at which the user attempts to access the device to the available access time to determine whether the device should be released from the base, the server transmitting the unlock message to the base if the access time is within the available access time wherein the server denies access to the device outside of the available access time.

6. A base apparatus for securing a mobile computing device stored within the base, the apparatus comprising:

a base that accepts at least a portion of the mobile computing device wherein the base restricts access to the mobile computing device;

a lock that secures the device within the base when locked and the lock releases the device from the base when unlocked;

a server in communication with the base wherein the server requires authentication from a user prior to unlocking a device for removal from the base, the server transmitting an unlock message to the base instructing the base to unlock the device from the base;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies available access limits defining the amount of time a user may access the device;

the server confirming that the user has not exceeded the available access limits to determine whether the device should be released from the base, the server transmitting the unlock message to the base if the user is within available access limits, the server denying access if the user has exceeded the available access limits.

7. A base apparatus for securing a mobile computing device stored within the base, the apparatus comprising:

a base that accepts at least a portion of the mobile computing device wherein the base restricts access to the mobile computing device;

a lock that secures the device within the base when locked and the lock releases the device from the base when unlocked;

a server in communication with the base wherein the server requires authentication from a user prior to unlocking a device for removal from the base, the server transmitting an unlock message to the base instructing the base to unlock the device from the base;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies a minimum charge of the device required to release the device from the base;

the server denying access to the device if the charge of the device is less than the minimum charge, the server transmitting the unlock message to the base if the charge of the device is greater than the minimum charge.

8. A base apparatus for securing a mobile computing device stored within the base, the apparatus comprising:

a base that accepts at least a portion of the mobile computing device wherein the base restricts access to the mobile computing device;

a lock that secures the device within the base when locked and the lock releases the device from the base when unlocked;

a server in communication with the base wherein the server requires authentication from a user prior to unlocking a device for removal from the base, the server transmitting an unlock message to the base instructing the base to unlock the device from the base;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies a damaged status of the device;

the server restricting access to the device if the damaged status indicates that the device is damaged, the server transmitting the unlock message to the base if the device is not damaged wherein the server denies access to the device if the device is damaged.

9. A base apparatus for securing multiple mobile computing devices stored within the base, the apparatus comprising:

a base that accepts at least a portion of the mobile computing device wherein the base restricts access to the mobile computing device;

a first wall extending vertically above the base;

a second wall extending vertically above the base, the second wall located opposite the first wall;

a receiving aperture of the base accepting insertion of the mobile computing device within the receiving aperture wherein the receiving aperture defined by an interior portion of the first wall and an interior portion of the second wall;

a lock secures the device within the base when locked and the lock releasing the device from the base when unlocked;

a server in communication with the base wherein the server requires authentication from a user prior to unlocking a device for removal from the base, the server transmitting an unlock message to the base instructing the base to unlock the device from the base;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies an available access time at which the device should be released from the base;

the server restricting access to the device to the available access time wherein the server compares an access time at which the user attempts to access the device to the available access time to determine whether the device should be released from the base, the server transmitting the unlock message to the base if the access time is within the available access time wherein the server denies access to the device outside of the available access time.

10. A base apparatus for securing multiple mobile computing devices stored within the base, the apparatus comprising:

a base that accepts at least a portion of the mobile computing device wherein the base restricts access to the mobile computing device;

a first wall extending vertically above the base;

a second wall extending vertically above the base, the second wall located opposite the first wall;

a receiving aperture of the base accepting insertion of the mobile computing device within the receiving aperture wherein the receiving aperture defined by an interior portion of the first wall and an interior portion of the second wall;

a lock secures the device within the base when locked and the lock releasing the device from the base when unlocked;

a server in communication with the base wherein the server requires authentication from a user prior to unlocking a device for removal from the base, the server transmitting an unlock message to the base instructing the base to unlock the device from the base;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies available access limits defining the amount of time a user may access the device;

the server confirming that the user has not exceeded the available access limits to determine whether the device should be released from the base, the server transmitting the unlock message to the base if the user is within available access limits, the server denying access if the user has exceeded the available access limits.

11. A base apparatus for securing multiple mobile computing devices stored within the base, the apparatus comprising:

a base that accepts at least a portion of the mobile computing device wherein the base restricts access to the mobile computing device;

a first wall extending vertically above the base;

a second wall extending vertically above the base, the second wall located opposite the first wall;

a receiving aperture of the base accepting insertion of the mobile computing device within the receiving aperture wherein the receiving aperture defined by an interior portion of the first wall and an interior portion of the second wall;

a lock secures the device within the base when locked and the lock releasing the device from the base when unlocked;

a server in communication with the base wherein the server requires authentication from a user prior to unlocking a device for removal from the base, the server transmitting an unlock message to the base instructing the base to unlock the device from the base;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies a minimum charge of the device required to release the device from the base;

the server denying access to the device if the charge of the device is less than the minimum charge, the server transmitting the unlock message to the base if the charge of the device is greater than the minimum charge.

12. A base apparatus for securing multiple mobile computing devices stored within the base, the apparatus comprising:

a base that accepts at least a portion of the mobile computing device wherein the base restricts access to the mobile computing device;

a first wall extending vertically above the base;

a second wall extending vertically above the base, the second wall located opposite the first wall;

a receiving aperture of the base accepting insertion of the mobile computing device within the receiving aperture wherein the receiving aperture defined by an interior portion of the first wall and an interior portion of the second wall;

a lock secures the device within the base when locked and the lock releasing the device from the base when unlocked;

a server in communication with the base wherein the server requires authentication from a user prior to unlocking a device for removal from the base, the server transmitting an unlock message to the base instructing the base to unlock the device from the base;

at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;

the lock unlocking to release the device from the base after receiving the unlock message;

a rule list identifying at least one rule required to be met to allow access to the device wherein the rule identifies a damaged status of the device;

the server restricting access to the device if the damaged status indicates that the device is damaged, the server transmitting the unlock message to the base if the device is not damaged wherein the server denies access to the device if the device is damaged.

13. A base apparatus for securing a mobile computing device stored within the base, the apparatus comprising:
 a base that accepts at least a portion of the mobile computing device wherein the base restricts access to the mobile computing device;
 a lock that secures the device within the base when locked and the lock releases the device from the base when unlocked;
 a server in communication with the base wherein the server requires authentication from a user prior to unlocking a device for removal from the base, the server transmitting an unlock message to the base instructing the base to unlock the device from the base;
 at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;
the lock unlocking to release the device from the base after receiving the unlock message;
 wherein the status of the user indicates whether the user:
 a) has abused or otherwise damaged at least one device,
 b) has available access time for a device,
 c) has lost or stolen a device,
 d) has been indicated as having good behavior, or
 e) is attempting to access the device during an available access time.

14. A base apparatus for securing a mobile computing device stored within the base, the apparatus comprising:
 a base that accepts at least a portion of the mobile computing device wherein the base restricts access to the mobile computing device;
 a lock that secures the device within the base when locked and the lock releases the device from the base when unlocked;
 a server in communication with the base wherein the server requires authentication from a user prior to unlocking a device for removal from the base, the server transmitting an unlock message to the base instructing the base to unlock the device from the base;
 at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;
the lock unlocking to release the device from the base after receiving the unlock message;
 wherein the status of the user indicates whether the user:
 a) has abused or otherwise damaged at least one device,
 b) has available access time for a device,
 c) has lost or stolen a device,
 d) has been indicated as having good behavior, or
 e) is attempting to access the device during an available access time.

15. A base apparatus for securing multiple mobile computing devices stored within the base, the apparatus comprising:
 a base that accepts at least a portion of the mobile computing device wherein the base restricts access to the mobile computing device;
 a first wall extending vertically above the base;
 a second wall extending vertically above the base, the second wall located opposite the first wall;
 a receiving aperture of the base accepting insertion of the mobile computing device within the receiving aperture wherein the receiving aperture defined by an interior portion of the first wall and an interior portion of the second wall;
 a lock secures the device within the base when locked and the lock releasing the device from the base when unlocked; and
 a server in communication with the base wherein the server requires authentication from a user prior to unlocking a device for removal from the base, the server transmitting an unlock message to the base informing the base to unlock a device if the user is authorized to access the device;
 at least one rule concerning a status of the user or a status of the device required to be met before releasing a device to an authenticated user, wherein the server confirms that the rule to release the device is met in addition to authenticating the user, the server transmitting the unlock message to the base if the rule is met and the user is authenticated;
the lock unlocking to release the device from the base after receiving the unlock message;
wherein the status of the user indicates whether the user:
 a) has abused or otherwise damaged at least one device,
 b) has available access time for a device,
 c) has lost or stolen a device,
 d) has been indicated as having good behavior, or
 e) is attempting to access the device during an available access time.

\* \* \* \* \*